(12) United States Patent
Kalavade et al.

(10) Patent No.: US 7,171,460 B2
(45) Date of Patent: Jan. 30, 2007

(54) METHOD AND APPARATUS FOR INTEGRATING BILLING AND AUTHENTICATION FUNCTIONS IN LOCAL AREA AND WIDE AREA WIRELESS DATA NETWORKS

(75) Inventors: Asawaree Kalavade, Gillette, NJ (US); Hong Jiang, Westfield, NJ (US); Penny Chen, Basking Ridge, NJ (US)

(73) Assignee: Tatara Systems, Inc., Acton, MA (US)

( * ) Notice: Subject to any disclaimer, the term of this patent is extended or adjusted under 35 U.S.C. 154(b) by 588 days.

(21) Appl. No.: 10/213,239

(22) Filed: Aug. 6, 2002

(65) Prior Publication Data
US 2003/0051041 A1    Mar. 13, 2003

Related U.S. Application Data

(60) Provisional application No. 60/323,570, filed on Sep. 20, 2001, provisional application No. 60/310,563, filed on Aug. 7, 2001.

(51) Int. Cl.
*G06F 15/173* (2006.01)
*G06F 15/16* (2006.01)

(52) U.S. Cl. .................. 709/223; 709/249; 709/203
(58) Field of Classification Search ........ 709/200–203, 709/220, 221
See application file for complete search history.

(56) References Cited

U.S. PATENT DOCUMENTS

| | | | |
|---|---|---|---|
| 5,761,425 A | 6/1998 | Miller | |
| 5,790,548 A | 8/1998 | Sistanizadeh et al. | |
| 6,061,346 A | 5/2000 | Nordman | |
| 6,256,498 B1 | 7/2001 | Ludwig | |
| 6,317,421 B1 | 11/2001 | Wilhelmsson et al. | |
| 6,389,008 B1 | 5/2002 | Lupien et al. | |
| 6,484,143 B1 | 11/2002 | Swildens et al. | |
| 6,647,426 B2 | 11/2003 | Mohammed | |
| 6,680,923 B1 | 1/2004 | Leon | |
| 6,769,000 B1* | 7/2004 | Akhtar et al. | 707/103 R |
| 6,789,110 B1* | 9/2004 | Short et al. | 709/221 |
| 6,791,974 B1 | 9/2004 | Greenberg | |
| 2001/0031636 A1 | 10/2001 | Hanson | |
| 2001/0036164 A1* | 11/2001 | Kakemizu et al. | 370/331 |
| 2002/0033416 A1 | 3/2002 | Gerszberg et al. | |
| 2002/0107792 A1 | 8/2002 | Anderson | |
| 2002/0169858 A1* | 11/2002 | Bellinger et al. | 709/220 |

* cited by examiner

*Primary Examiner*—Jeffrey Pwu
*Assistant Examiner*—Ji-Yong D. Chung
(74) *Attorney, Agent, or Firm*—David H. Judson

(57) ABSTRACT

A converged network accessible by client terminals is provided. The converged network includes a wide area network, a local area network, and a gateway linked to the wide area and local area networks. The gateway integrates billing and authentication functions of the wide area and local area networks.

32 Claims, 31 Drawing Sheets

METHOD AND APPARATUS FOR INTEGRATING BILLING AND AUTHENTICATION FUNCTIONS IN LOCAL AREA AND WIDE AREA WIRELESS DATA NETWORKS

RELATED APPLICATIONS

The present application is based on and claims priority from Provisional Patent Application Ser. No. 60/310,563 filed on Aug. 7, 2001 and entitled "A Method and Apparatus to Integrate Wireless WAN and IP-LAN Based Authentication and Billing Systems" and Provisional Patent Application Serial No. 60/323,570 filed on Sep. 20, 2001 and entitled "A Method and Apparatus to Integrate Wireless WAN and IP-LAN Based Authentication and Billing Systems."

BACKGROUND OF THE INVENTION

1. Field of the Invention

The present invention relates generally to wireless data networks and, more particularly, to a method and apparatus for converging billing and authentication functions of local area networks (LANs) and wide area networks (WANs).

2. Description of Related Art

Multiple wireless data technologies are emerging in both the wide area as well as the local area. In the wide area, cellular operators have already deployed 2 G data technologies such as circuit switched data. Many operators are currently migrating their networks to higher-speed, packet-based 2.5 G technologies such as, e.g., GPRS (General Packet Radio Service) and 1XRTT. There is also an increasing deployment of local area 802.11b based networks in "hotspots" such as airports, convention centers, and even coffee shops. These hotspots are operated either by wireless Internet service providers (such as, e.g., Wayport and Boingo in the U.S. and Jippii in Finland) or by cellular operators (such as, e.g., Sonera in Finland and Telia in Sweden).

Wide area wireless data is typically accessed through 2.5 G smart phones or personal digital assistants (PDAs) and computer laptops equipped with a 2.5 G network interface card. Many vendors now make GPRS cards in a PCMCIA form factor. Network providers support 2.5 G data by adding GPRS equipment such as SGSNs (Serving GPRS Service Node) and GGSNs (Gateway GPRS Service Node) to their core network and by making software upgrades to their existing 2 G radio infrastructure.

Local area wireless data is typically accessed through a mobile client device such as laptop or a PDA equipped with an 802.11b network interface card. To provide access, wireless Internet service providers (WISPs) typically deploy "access points", which are 802.11b base stations. These access points are connected to the Internet through typical IP devices such as routers and switches.

These wide area and local area wireless technologies complement each other on the basis of coverage, mobility, bit rate, and cost. Wide area technologies provide a much larger coverage area compared to local area technologies and are also designed to support seamless mobility throughout the wide area. Local area technologies such as 802.11b provide bit rates up to 11 Mbps, which are much higher than the tens of kbps offered by WAN technologies. While 802.11b cannot be used to provide wide-area coverage, it is a cost-effective way to provide localized high-speed data. The total cost of ownership for providing localized high bandwidth data access using 802.11 based technology is typically 5–10 times lower than 2.5 G based wide area deployments. Further, 802.11 technologies also provide an alternative way to provide localized high-speed packet-based wireless data for operators who might not be migrating to 2.5 G for cost or spectrum reasons.

While both wireless LANs and WANs are currently being deployed, they are operated independently as separate entities without any interaction between them. In particular, the WAN and LAN systems have different sets of authentication mechanisms, billing systems, user profile databases, network management systems, and service platforms.

Furthermore, LAN deployments often tend to be regionally operated, and each regional provider offers different rates and maintains its own billing and authentication systems. Users accordingly have to maintain separate accounts with various LAN and WAN operators. This leads to multiple accounts, passwords, charges, and bills, which is generally very inconvenient and unmanageable for users.

A need accordingly exists for integrating the operation of local and wide area wireless networks, particularly their authentication and billing functions.

BRIEF SUMMARY OF EMBODIMENTS OF THE INVENTION

In accordance with one or more embodiments of the invention, a method is provided for managing usage of a local area network (LAN) by a subscriber of a wide area network (WAN). The method includes the steps of: (a) detecting an attempt by a terminal operated by said subscriber to access said LAN; (b) authenticating the subscriber based on authentication information received from the subscriber and corresponding information of record at a WAN authentication system; (c) when the subscriber is authenticated, allowing the subscriber to access the LAN; and (d) transmitting information on subscriber usage of the LAN to a WAN billing system for integrated billing of LAN and WAN usage.

In accordance with one or more embodiments of the invention, a method is provided for managing usage of a local area network (LAN) by a subscriber of a wide area network (WAN). The method includes the steps of: (a) receiving a request for authenticating a WAN subscriber desiring access to said LAN; (b) authenticating the subscriber based on authentication information received from the subscriber and corresponding information at a WAN authentication system; (c) receiving information on LAN usage by said subscriber; and (d) transmitting said information on LAN usage to a WAN billing system for integrated billing of LAN and WAN usage by said subscriber.

In accordance with one or more embodiments of the invention, a converged network accessible by wireless client devices is provided. The converged network includes: a wide area network; a local area network; and a gateway linked to said wide area and local area networks, said gateway integrating billing and authentication functions of said wide area and local area networks.

In accordance with one or more embodiments of the invention, a converged network accessible by wireless client devices is provided. The converged network includes: a wide area network (WAN); at least one local area network (LAN); and a gateway linked to said WAN and said at least one LAN, said gateway authenticating WAN subscribers desiring access to said at least one LAN based on credentials of said subscriber within said WAN, said gateway also collecting information on LAN usage by the subscriber and converting said information to a format useable by a billing system of the WAN.

In accordance with one or more embodiments of the invention, a gateway is provided for managing usage of a local area network (LAN) by a subscriber of a wide area network (WAN). The gateway includes: an authentication module for authenticating a WAN subscriber desiring access to said LAN based on authentication information received from the subscriber and corresponding information of record from a WAN authentication system; and an accounting module for collecting information on LAN usage by the subscriber and converting said information to a format useable by a billing system of the WAN.

In accordance with one or more embodiments of the invention, a method is provided for authenticating a subscriber of a wide area network (WAN) for use of a local area network (LAN). The method includes the steps of: receiving an authentication request from a LAN access controller indicating that an attempt by the subscriber of the WAN to access the LAN has been made; querying the subscriber of the WAN for authentication information; receiving the authentication information from the subscriber of the WAN; determining whether the authentication information from the subscriber of the WAN is valid; and providing an indication to the LAN access controller that the subscriber of the WAN should be permitted to use the LAN when the authentication information from the subscriber of the WAN is valid.

In accordance with one or more embodiments of the invention, a method is provided for allowing multiple wireless operators to provide integrated authentication and billing services for respective subscribers within one wireless LAN hotspot. The method includes: (a) modifying a hotspot authentication server to support multiple operators by assigning a separate network access identifier for each operator; (b) associating a gateway of each operator with each respective network access identifier; and (c) forwarding authentication requests received by the authentication server to appropriate gateways, depending on the operator selected by the user, each selected gateway providing authentication and billing for the selected user.

In accordance with one or more embodiments of the invention, a method is provided for allowing multiple wireless operators to provide 802.11 services within a shared hotspot. The method includes the steps of: (a) assigning one of the available channels from the 802.11 spectrum to each operator; (b) assigning a unique ESSID for each operator; (c) assigning the selected ESSID to all the 802.11 access points managed by each operator; and (d) providing user software that selects the ESSID to associate with, depending on the preferred network.

These and other features will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

DETAILED DESCRIPTION OF PREFERRED EMBODIMENTS

Figure 1:
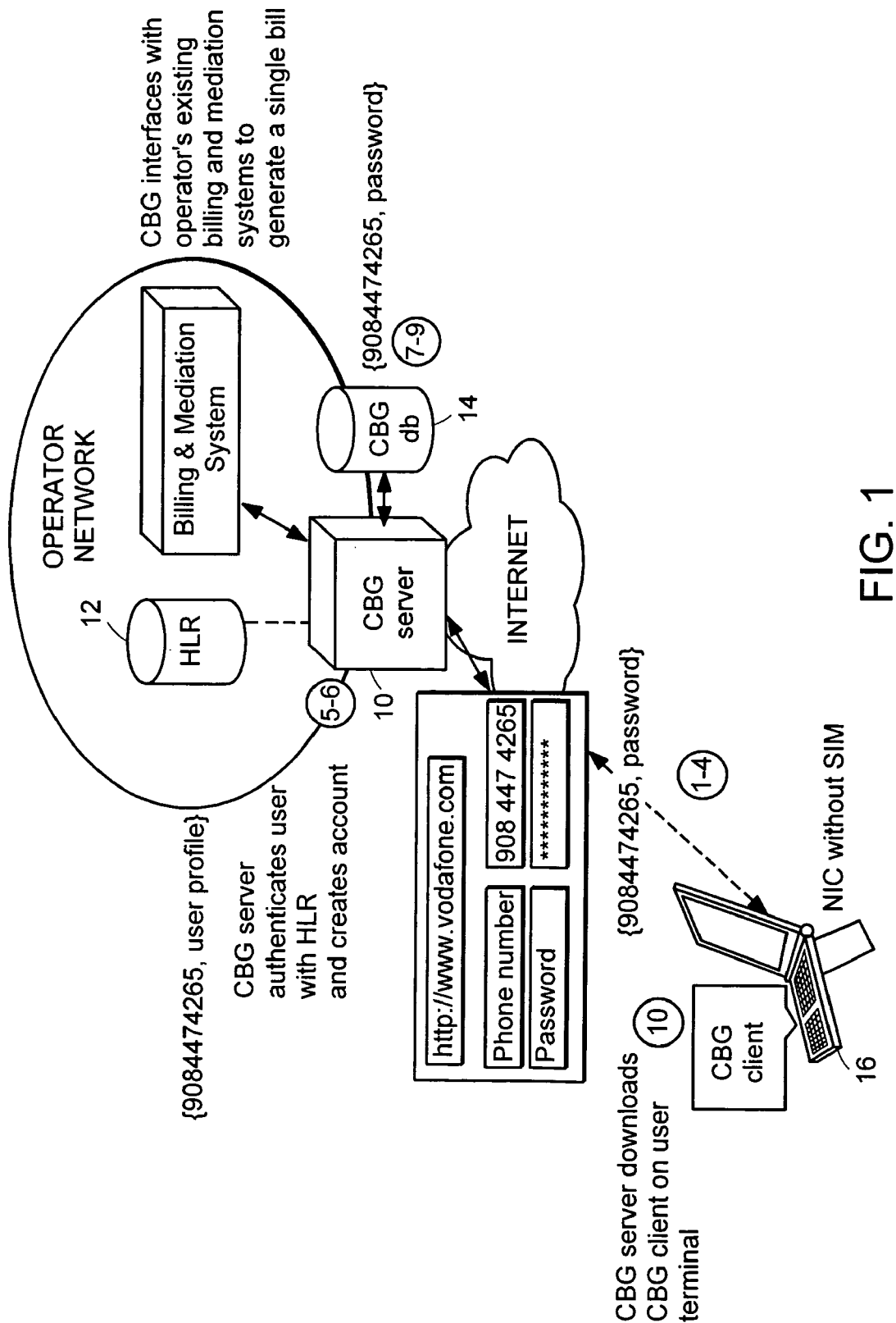
FIG. 1 is a simplified diagram illustrating CBG operation for non SIM-enabled terminals in accordance with some embodiments of the invention.

The present invention is generally directed to a method and an apparatus for integrating wireless WAN and IP LAN based systems, particularly their authentication and billing systems.

U.S. patent application Ser. No. 10/173,084 filed Jun. 17, 2002 describes a method and apparatus for converging local area and wide area wireless data networks. Application Ser. No. 10/173,084 is expressly incorporated in its entirety by reference herein.

One or more embodiments of the invention are directed to a Converged Billing/Authorization Gateway (CBG) that enables a wireless WAN operator to provide LAN access service to its existing WAN subscribers with a single bill and account. The CBG can integrate the authentication and billing systems of wireless operators with authentication and billing mechanisms used in LAN networks. The WAN operator's backend systems typically interface with a home location register (HLR) database, while the LAN mechanisms typically use protocols like RADIUS. The CBG integrates these two systems such that a WAN subscriber can access LAN services using the subscriber's WAN identity, thus avoiding the need for a separate bill for LAN usage. Further, the WAN operator can offer value-added services while leveraging its existing billing and authentication infrastructure. The CBG can be a server component that is preferably deployed close to the carrier's network and links into the carrier's network.

Current Authentication and Billing Systems

Current WAN Authentication and Billing Systems

Cellular users or WAN subscribers are typically authenticated in the WAN through the WAN operator's HLR, which contains user profile information as well as authentication parameters.

Specifically, in the case of a GSM/GPRS (Global System for Mobile Communications/General Packet Radio Service) system, each user's terminal has a SIM (Subscriber Identity Module), which contains authentication information. Also, each terminal has a specific IMSI (International Mobile Subscriber Identity) number. At subscription sign up, the SIM is programmed with a unique secret (Ki) and authentication algorithms A3/A8. Only the terminal SIM and the HLR know this information. When the user wishes to use his cellular terminal, the HLR presents an authentication challenge random number (RAND) to the terminal. The SIM computes a response using Ki and A3. The response (SRES) is sent to the HLR. If the response matches the expected response computed by the HLR, the user is authenticated and allowed to access the system.

CDMA (Code Division Multiple Access) systems use a similar key-based authentication scheme, using an algorithm called CAVE. The user authentication information is embedded in the terminal, and there is no separate SIM card as in the case of GSM.

Usage information is typically generated in the form of Call Detail Records (CDR) by different network elements for voice usage as well as for data use such as a WAP (Wireless Application Protocol) gateway. Mediation systems collect information from various network elements and present it to the billing systems that generate the final bill for the subscriber. Most billing today is based on minutes of use. As new data services are being deployed, other billing metrics such as volume of data, application type, etc., are also being used. Emerging standards such as IPDR (IP data records standard as specified by the ipdr.org consortium) define the format for generating data records for IP usage.

Current LAN Authentication and Billing Systems

Authentication and billing in LANs is typically done through IP mechanisms such as RADIUS and DIAMETER. RADIUS is an IETF specification and specifies a mechanism for authenticating a remote user into the network through an attribute/value pair such as a login name and a password. RADIUS also allows collection of accounting information, where the network access server sends accounting information to a RADIUS server. The access server typically sends duration, number of packets, and other usage information to the RADIUS server. The billing system then generates a bill based on the appropriate fee policy.

DIAMETER is the next-generation authentication and billing protocol and extends RADIUS with additional attributes for authentication and billing.

Billing and authentication schemes today are generally focused on either LAN users or on WAN users and do not allow combined LAN/WAN based authentication for LAN usage.

Some LAN based systems can allow a user to access the Internet from multiple LANs using a single account and yet receive a single bill. These systems are traditionally referred to as clearinghouses and settlement systems. The user maintains a single account with a clearinghouse such as, e.g., iPass, GRIC, or Excelan. The user accesses the network from any LAN that is part of the partnership agreement with the clearinghouse through this single account and receives a single bill. However, this mechanism is restricted to LAN-based access only and does not couple with WAN systems.

Converged Billing/Authentication Gateway

A CBG in accordance with one or more embodiments of the invention allows wireless WAN operators to use their existing WAN authentication and billing systems to provide services to LAN users.

Briefly, the CBG can allow a LAN user using wired as well as wireless network interface cards to get authenticated and billed against the WAN operator's WAN infrastructure. To achieve authentication integration, the CBG uses a combination of WAN and LAN based authentication schemes. To achieve billing integration, the CBG can generate real-time usage information for LAN access in a format that is compatible with the WAN billing systems. This enables the operator's mediation systems to collect the usage information and combine it with other WAN usage information to generate a single bill, regardless of LAN or WAN access.

Authentication Integration

Authentication integration relates to integrating authentication requests between the LAN and the WAN. As previously described, LAN authentication typically uses protocols such as RADIUS and DIAMETER to authentication users. Most of these schemes are based on a login/password mechanism. WAN authentication in GPRS/GSM technology uses SIM cards to store and manage user identity data and authenticate the user with the HLR.

In accordance with various embodiments of the invention, users can access the LAN/WAN from a variety of terminals with different features. By way of example, terminals can include laptops and PDAs (personal digital assistants) and other mobile computing devices. These terminals can have a PCMCIA slot that can be used to attach an 802.11 NIC. Also, many devices sold now have an integrated 802.11 network interface.

These terminals typically generally fall into two categories with respect to SIM support. One category includes terminals lacking inherent SIM support. In this case, the authentication challenge is to integrate the LAN authentication into the SIM infrastructure. The second category of terminals includes terminals with SIM support. For instance, some users may use a PCMCIA SIM reader to hold a SIM card. Alternatively some vendors may have SIM embedded into the NIC itself. This category is typically smaller than the first category of terminals. In this case, the authentication challenge is to leverage the SIM in the terminal to authenticate with the SIM infrastructure.

The authentication scheme in accordance with the various embodiments generally falls into three broad categories. The first category of authentication is designed for terminals without SIM support. The authentication mechanism can use the WAN database for service creation. Subsequently, the scheme uses a LAN-based login/password scheme for authentication. This scheme can also use LAN-based authentication protocols such as 802.1x.

The second category of authentication is designed for terminals with SIM support. In this case, the SIM in the terminal is used to provide authentication during service signup as well as service usage.

The third category of authentication is designed for terminals without SIM support. In this case, the SIM in a user's phone is used to provide the integration with the SIM infrastructure. The third category is particularly advantageous because while it does not require the terminal to have SIM support, it still integrates tightly into the SIM infrastructure by using the SIM on the user's phone to provide authentication. This additional security measure enables the operator to authenticate that the user logging in is also in possession of the phone. This additional level of authentication can also provide location updates for LAN users within the WAN network.

These authentication mechanisms are described in further detail below following a brief summary of general billing integration issues.

Billing Integration

LAN based billing systems use protocols such as RADIUS to collect usage information. WAN networks have a generally more sophisticated set of billing systems. Some embodiments of the present invention are directed to integrating the two systems by picking up the usage information from the LAN and converting it to a format that can be accepted by the WAN billing systems. The usage collection in accordance with various embodiments can be accomplished in multiple ways, including e.g., using the following three approaches.

The first approach is to provide a client on the user's terminal that can collect usage information as the user uses the network and applications. This information can be delivered to the CBG to convert to the WAN format.

A second approach is to leverage the existing usage measurement infrastructure within the LAN to collect the usage information. For instance, the routers or network access servers in the LAN typically collect accounting information such as duration and volume of usage. This information can be accessed and delivered to the WAN systems by the CBG.

A third approach is to deploy additional monitoring equipment at the hotspot location to collect usage information. This can, e.g., be a layer 3–7 device that parses user traffic to collect usage information. This device may be deployed as an active or a passive device. For instance, the monitoring equipment could be placed in the direct path of the connection between the client and the Internet. Alternatively, it could be tapped off of the connection through a hub. This device can be designed to collect information for usage, duration, as well as look at layer 7 headers to determine more details about the application usage.

An advantage of the first approach is that it does not require any interfacing with the LAN equipment directly. Also, application-level information can be collected as well by parsing packets going in and out of the network interface.

An advantage of the second approach is that it does not require client support and hence alleviates any privacy concerns.

One advantage of the third approach is that it can allow a much more detailed level of information collection.

The billing integration approaches are described in greater detail further below. Note that in some of the call flows described in the authentication description, a potential step of downloading a client on the user's terminal is discussed. Note that this step is optional and only needed if a client-based approach is selected.

Authentication Integration Mechanisms

The following is a discussion of three primary authentication integration approaches in the CBG. The three approaches are discussed first followed by a description of operational flow.

Dual LAN/WAN Authentication for Non-SIM Terminals

The first mechanism in accordance with some embodiments is to use the WAN authentication infrastructure to authenticate the user at service signup. Specifically, the user's information in the WAN/HLR is verified before the user is allowed to create a service. Once the user is authenticated, a LAN-based login/password is created by the CBG. The login can be, e.g., the user's cell phone number. For subsequent service usage, the CBG uses LAN based authentication mechanisms to authenticate the user. This dual-mode authentication scheme allows a WAN subscriber to access LANs through LAN-based login/password style authentication while still coupling with the operator's back-end authentication systems.

This architecture has several advantages. First, by using the HLR for service sign up only, it limits the number of accesses to the HLR. Since wireless operators are typically very sensitive to usage of their HLR's, this architecture reduces the load on the HLR. Further, by restricting the use of the HLR, it limits the load on the HLR. Also it does not place any special requirements on the terminals that can be supported.

To address possible security limitations of the login/password authentication, a recent development on the wireless LAN security front has been to use 802.1X for authentication. 802.1x is a port-based security protocol proposed by the IEEE. 802.1x allows blocking of all access until the user is authenticated.

Support for 802.1x ordinarily requires changes in the terminals as well as in access points APs. Specifically, the APs should be upgraded to block all user traffic until authenticated. Most major vendors are now upgrading their APs to support 802.1X. On the terminal side, the drivers should be upgraded to send authentication information. The new Windows XP operating system has inherent 802.1x support built into it. 802.1x uses RADIUS as the method to transfer authentication information between the AP and the RADIUS server and the actual authentication messages are transferred through a protocol called EAP. Using EAP, the actual authentication can be accomplished through a number of standard protocols, such as TLS, TTLS, SRP, etc.

The CBG also supports 802.1x authentication. The RADIUS server in the CBG should be modified to support EAP parsing.

WAN-based Authentication for SIM-enabled Terminals

The CBG in accordance with some embodiments also supports pure WAN-based authentication mechanisms for LAN access when the user's terminal has SIM support. This may be the case if the laptop or PDA has a SIM reader. Another possibility is the case where the user has a special network interface card that has a SIM support. Nokia, e.g., makes such a wireless LAN NIC. In this scheme, the CBG uses the HLR to authenticate the user during service sign up as well as during real-time service usage. Specifically, the user's WAN device is used to provide authentication even in the LAN. This is accomplished through the SIM card, which is used for authentication in the GSM/GPRS network. In this case, the SIM is queried to give the authentication information even during LAN usage. This authentication scheme is similar to how mobile devices are authenticated in the GSM/GPRS network today.

It is possible to also create a login/password in this case. This is useful to authenticate the user in case he does not have access to the SIM at some point. This part of the approach would be similar to the first approach.

An advantage of this scheme is that the user's existing SIM is used for authentication. It is as secure as the GSM/GPRS authentication.

Two-factor Authentication for Non-SIM Terminals

A third possible authentication mechanism in accordance with some embodiments uses a combination of LAN and WAN based authentication for both service signup as well as for service usage. Specifically, in this scheme, a two-factor strong authentication mechanism is provided to secure access for terminals without inherent SIM support. In this method, a login/password is used to authenticate users initially. This interfaces with the existing LAN based authentication mechanism. In addition, the user's phone is used as a secure token to further authenticate that the user signing in from the computer indeed has possession of the phone as well. This additional level of security is needed when the user information (such as location) is to be updated within the HLR.

To address this further, note that a number of WAN services such as SMS messaging and location-aware services require that the user's location be updated in the HLR. Since the HLR is a core element in the operator's infra-structure, the operator typically recommends that the user be authenticated with great security before updating location. This third authentication mechanism allows a higher degree of authentication than the first authentication mechanism described above. This approach hence allows users with terminals without SIM cards to be authenticated against the operator HLR by leveraging the phone. As a result, location updates are possible for LAN based users.

An advantage of this approach is that it provides a strong authentication mechanism. By ensuring that the user has the phone, a token-based identification can be provided. This mechanism may alleviate the operators' concerns in providing secure access to other services. This scheme uses the terminal and the phone, and it does not place any special requirements on the terminal. Further, in cases where the user may not have his phone or there may not be coverage, the CBG can use the login/password to provide a baseline authentication that provides access to at least basic services if desired.

These three authentication mechanisms are described in greater detail below. In all these cases, the CBG preferably integrates usage information with the operator's billing system to produce a single bill for the subscriber.

Other possible authentication schemes are also possible, including the following. First, for non-SIM enabled terminals, a "software" SIM can be placed on the user's terminal. This would store on the user's terminal, some of the authentication information that is typically stored on the SIM module. In this case, the SIM authentication is emulated through a "virtual" SIM on the user terminal.

An alternative to this approach is to maintain the user's SIM information in a server within the network. In this approach, the user can login through a login/password and authenticate with the network server. The server then communicates with the HLR by emulating the user terminal by using the SIM information stored at the server. This approach eliminates some of the security risks by putting SIM information within the server.

The CBG can include two components: (a) a CBG server and (b) a CBG client. The CBG server is installed in the operator's network and interfaces with the operator's billing and authentication systems. The CBG client is optional, and needed when the user has a SIM-enabled terminal and the SIM has to be accessed to send authentication information. The client may also optionally be used to collect and transmit usage information.

CBG Authentication Operation Flow

An example of CBG operation for Dual WAN/LAN based authentication for non-SIM terminals is now described. FIG. 1 shows the operation of the CBG for the dual-mode authentication scheme, when the subscriber has a regular LAN card without any SIM features. In this case, the authentication uses a combination of WAN and IP based authentication schemes. When the user first subscribes for service, the CBG queries the operator's customer databases (HLR) to validate the user's identity, similar to how the WAN operator checks identity before creating new services today (e.g., check social security, address, data of birth, or other personal information). After the user is validated, the CBG 10 instructs the user to create a login and password. The login can be, e.g., the user's cell phone ID for convenience. This information is stored in the subscriber database. This can be either part of the CBG or can be maintained by the operator. For subsequent use, the CBG uses this login/password for authentication. Other operator-specific policies may be stored in the CBG database as well.

The CBG server periodically validates the user information in the CBG database 14 with the operator's customer databases 12 in order to keep the services and users current. This is done off-line and is not required during service usage. The frequency of update can be tuned, based on the operator's policies as desired.

One possible method for service signup flow is as follows:
1. User goes to operator's web site to sign up for wireless LAN service using terminal 16. Alternatively, the user can call up a service representative to sign up for service.
2. Operator queries if user has a SIM enabled terminal.
3. If not, user is queried for phone number. (The method for SIM enabled terminal is described later in this document.)
4. The phone number is sent encrypted to CBG server 10.
5. The CBG server 10 determines the IMSI associated with this phone number and gets the user's records for this IMSI from operator customer databases.
6. The CBG server 10 authenticates the user by some other information similar to methods used to modify existing services (e.g., address, social security number or other information).
7. The CBG server 10 asks user to create a password.
8. The password is sent encrypted by the user (e.g., through SSL 128 bit encryption).
9. The CBG server 10 stores password and IMSI number pair in its local CBG database. Future authentication is performed through this login/password combination. At this time a client is optionally downloaded on the user terminal.

To use the service:
1. The user goes to a WLAN hotspot.
2. The Access server at the hotspot (e.g., router) blocks traffic from the user terminal.
3. The Access server at hotspot communicates with CBG server for authentication through RADIUS style protocol.
4. The CBG server queries the user for login/password information.
5. This information is sent encrypted to the CBG server by the CBG client.
6. The CBG server authenticates the user against its database and informs the router at the hotspot to authorize traffic for the client.

An example of CBG operation with dual LAN/WAN authentication using 802.1x is now described. The service signup flow under this approach is as follows:
1. The user goes to operator's web site to sign up for wireless LAN service.
2. The operator queries if the user has a SIM enabled terminal.
3. If not, the user is queried for phone number.
4. The phone number is sent encrypted to the CBG server.
5. The CBG server determines the IMSI associated with this phone number and gets user's records for this IMSI from operator customer databases.
6. The CBG server authenticates the user by some other information similar to methods used to modify existing services (e.g., using address, social security number, or other information).
7. The CBG server asks the user to create a password.
8. The password is sent encrypted by the user (through, e.g., SSL 128 bit encryption).
9. The CBG server stores the password and IMSI number pair in its local CBG database. Future authentication is performed through this login/password combination.
10. If the user terminal does not have 802.1x support, the operator downloads the 802.1x client on the user terminal.
11. Alternatively, in some specific 802.1x based cases, certificates are used for authentication. In this case, the operator can either assign a user certificate or verify the certificate before authentication.

To use the service:
1. The user goes to a wireless LAN hotspot.
2. The 802.1x-enabled 802.11 access point blocks activity when the user's NIC tries to access the network.
3. The driver on the user terminal 16 exchanges authentication information with the access point. The authentication depends on the protocol involved. For example, in the case of a TLS (RFC 2246) authentication, the user is authenticated through a certificate. In the case of TTLS (draft-ietf-pppext-eap-ttls-01.txt) authentication, the user is authenticated through a login/password sent over EAP (RFC2284).
4. The CBG server 10 authenticates the user against its database 14 and informs the access point at the hotspot to authorize traffic for the client.

Other than the fact that the authentication information is sent through EAP, this operation is similar to the basic RADIUS based authentication.

An example of CBG operation with WAN-based authentication for SIM-enabled terminals is now described.

As previously mentioned, WAN subscribers are typically authenticated through a combination of the phone number, secret keys, and authentication algorithms shared between the terminal and the HLR. Specifically, in the case of GSM/GPRS networks, the terminal information is stored in a SIM card. The SIM card is typically used to authenticate WAN subscribers in the GSM network. When the WAN subscriber goes to the LAN, it would be desirable to use the same SIM for LAN authentication as well.

Some vendors (e.g., Nokia) provide SIM cards that can be removed from the cell phone and attached to a LAN card such as an 802.11 NIC. In this case, the LAN card has an associated SIM reader that can be used to query the SIM for authentication information.

Figure 2:
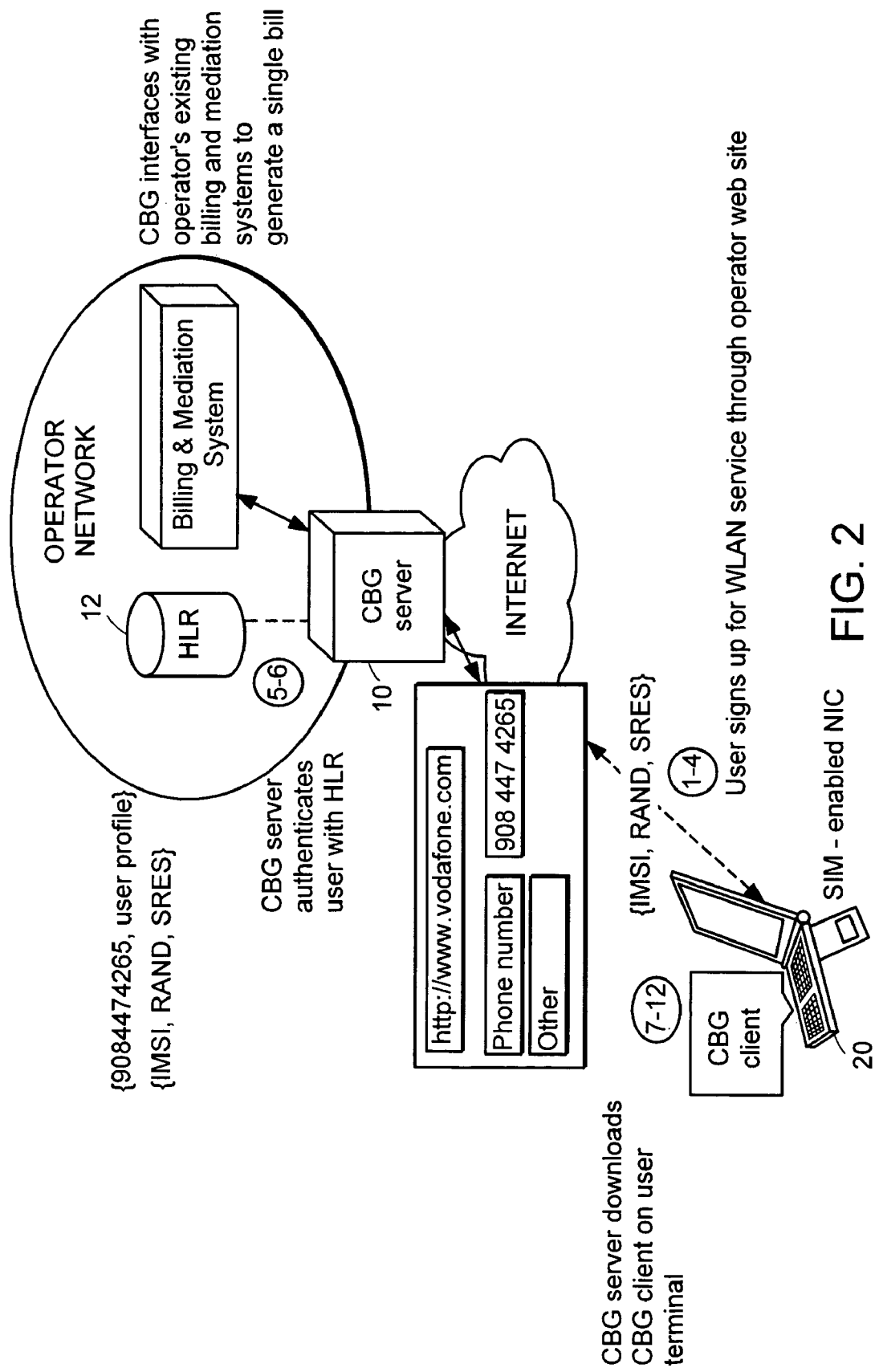
FIG. 2 is a simplified diagram illustrating CBG authentication for SIM-enabled terminals in accordance with some embodiments of the invention.

FIG. 2 illustrates at a high-level the operation of the CBG system when authenticating subscribers that have a SIM enabled terminal 20. In this case it is assumed that the SIM card is attached to a LAN terminal 20 and that the SIM can be queried to get authentication information.

One approach for service signup flow can use the basic GSM authentication mechanisms as follows:

1. The user goes to WAN operator's web site to sign up for wireless LAN service.
2. The operator downloads small client on terminal 20. (This client is responsible for sending authentication from the SIM.)
3. The user enters his phone number on web site (e.g., sent through 128 bit SSL encryption).
4. The web site communicates with CBG server 10.
5. The CBG server 10 contacts HLR 12 to get authentication information for the IMSI number associated with the user phone number.
6. The HLR 12 responds with an {IMSI, [RAND, SRES]} vector, where RAND is a challenge and SRES is expected response to challenge.
7. The CBG server 10 sends the RAND to terminal 20.
8. The CBG client on terminal 20 sends this information to the SIM.
9. The SIM computes the SRES and informs the client.
10. The CBG client sends the SRES to CBG server 10.
11. The CBG server 10 compares the SRES received with the value from HLR 12.
12. If it matches, the user's terminal 20 is validated for service.

The {RAND, SRES} exchange is part of the standard GSM authentication mechanism and is defined by the GSM standard.

To use the service:

1. The user goes to a WLAN hotspot.
2. The access server/router at hotspot blocks activity until the user is validated.
3. The Hotspot forwards an authentication request to the CBG server 10 through a RADIUS style protocol.
4. The CBG server 10 queries the user terminal 20 for authentication information.
5. The user enters phone number information.
6. The CBG server 10 validates the terminal through the challenge/response scheme described in steps 5–11 in the signup phase described above. The SIM client sends its response.
7. The CBG 10 informs router at the hotspot to authorize traffic for client if there is a match.

Note that in this case, the user can also create a login/password in addition to the SIM authentication. This would be similar to the first case described earlier. This will allow the user to login even when his SIM may not be available. If desired, this can provide access to limited services only.

In addition to the two cases of SIM-based terminals described above, another possibility for the use of the SIM based approach is as follows. The user's terminal is a laptop with two network interface slots. One slot can contain a LAN interface card (e.g., 802.11b NIC) and the other can contain a WAN interface card (e.g., GPRS or a CDMA NIC). The WAN NIC is designed typically to authenticate itself with the WAN network through the embedded keys and encryption algorithms. The challenge/response are typically communicated over the air interface. However, if the WAN NIC has an interface that allows the challenge to be provided through a software interface, then the same NIC can be used for authenticating the LAN user as well. Specifically, the CBG would send the challenge to the client on the terminal. This client in turn passes the challenge to the WAN NIC. The WAN NIC computes the response, the response is read by the CBG client, and is communicated to the CBG server. The CBG server matches the received response with the expected response obtained from the HLR. If the two match, the LAN user is authenticated.

The SIM-enabled 802.11 NIC example described earlier is a specific instance of this scenario, where the CBG client can interface with the SIM through a SIM reader embedded in the NIC.

For the sake of simplicity, further description of WAN-based authentication involves the case where the SIM is connected to a NIC with a SIM reader. However, as would be understood by those skilled in the art, the same mechanism can apply to other WAN-schemes as well.

Figure 3:
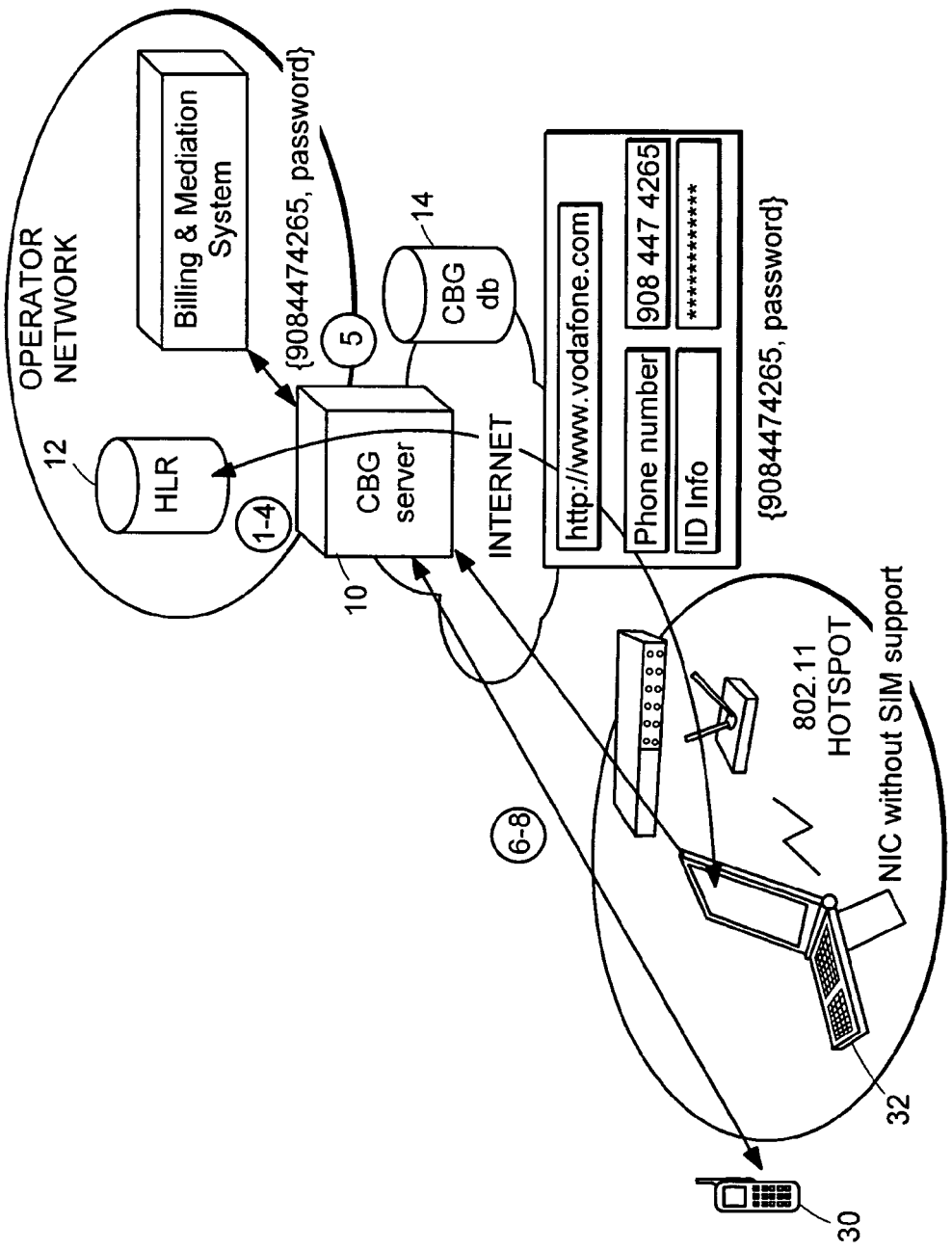
FIG. 3 is a simplified diagram illustrating CBG authentication using a two-factor security scheme in accordance with some embodiments of the invention.

An example of CBG operation with two-factor secure token authentication is described with reference to FIG. 3.

As mentioned earlier, this approach uses a two-factor authentication scheme, which uses a combination of a shared secret (login/password) and the SIM on a user's phone 30. Briefly, the user first logs in through a login and password. This login/password is stored in the CBG local database 14. This mechanism integrates with the existing RADIUS servers at a hotspot location. Subsequently, the authentication system validates the user with an additional secret token using the user's phone 30. There are several possible mechanisms for accomplishing this.

An example service signup flow is as follows.

1. The user goes to operator's web site to sign up for wireless LAN service.
2. The user enters phone number on the web site (sent, e.g., through 128 b SSL encryption).
3. The web site communicates with the CBG server 10.
4. The CBG server 10 contacts the operator databases to validate the user through other information.
5. The user creates an account with the CBG 10 where the login is the phone number.
6. The CBG 10 sends an additional secret token to the user's phone 30.
7. The user returns this token to the CBG 10 by entering it on the laptop or other terminal 32.
8. The CBG 10 validates that the user is in possession of the phone 30 and creates account for user.

To use the service:

1. The user goes to a WLAN hotspot.
2. The access server/router at the hotspot blocks activity until the user is validated.
3. The hotspot forwards an authentication request to the CBG server 10 through a RADIUS type protocol.
4. The CBG server 10 verifies the user's login/password.
5. The CBG 10 sends an additional secret token to the user's phone 30. There are several ways in which secret tokens can be delivered to users. Examples of these are described in further detail below.
6. The user returns the secret.
7. The CBG 10 validates that the user is in possession of the phone 30 and allows the user to start using the service.

Various methods are possible to use the phone for additional validation.

Figure 4:
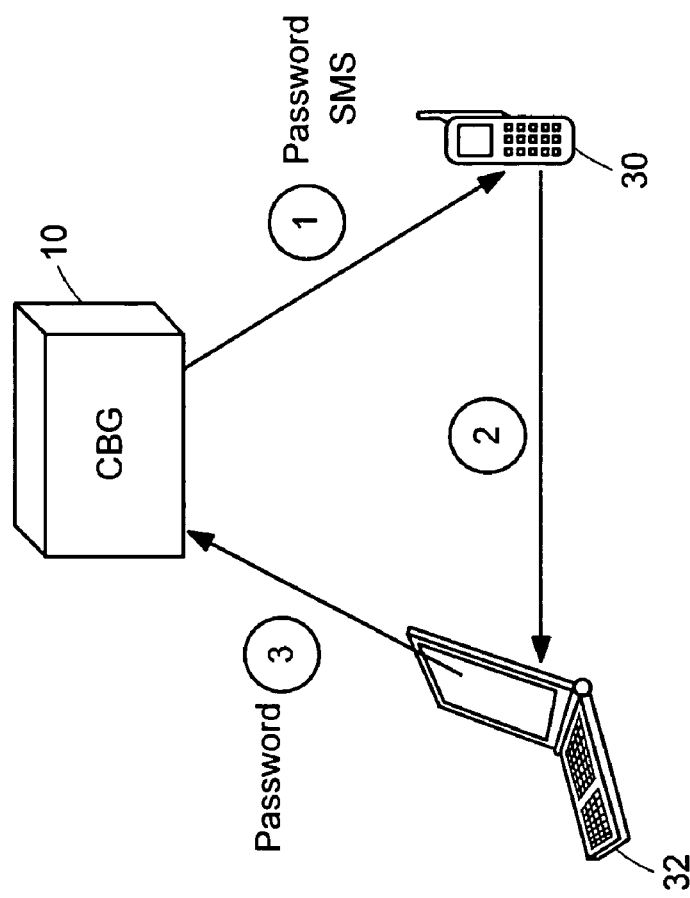
FIG. 4 is a simplified diagram illustrating one possible CBG two-factor authentication scheme in accordance with some embodiments of the invention.

One example involves a GSM delivered password. In this scheme, the CBG generates a unique one-time session password. This password is sent to the user's phone 30 through an SMS (short message service) or a USSD (Unstructured Supplementary Services Data) message. The user reads this password from the phone and types it onto the laptop 32 through a web page interface provided by the CBG 10. The CBG 10 receives the password and compares it with what was sent to the phone. The match ensures that the user who logged in using a certain phone number as the login, is also in possession of the phone. There is a typical latency of a few seconds before this closed loop control is finished, since it takes time for the SMS to be delivered to the user's phone 30. This is summarized logically in FIG. 4. Note that the random password used can either be generated in the CBG itself or it could be obtained from the HLR. It is possible, e.g., to use the RAND number provided by the HLR for SIM authentication as the seed to generate this password.

One advantage of this scheme is that it supports all terminal types since all phones support incoming or mobile terminated SMS. There is also ease of use for users who just type in a password from the phone into a laptop.

Figure 5:
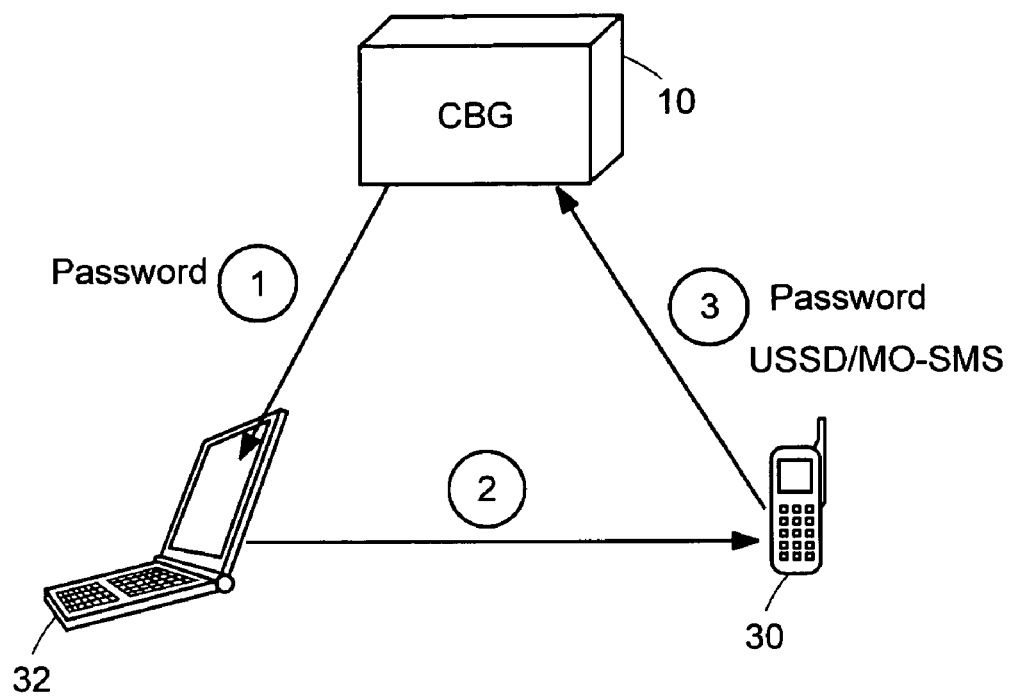
FIG. 5 is a simplified diagram illustrating another possible CBG two-factor authentication scheme in accordance with some embodiments of the invention.

Another possible scheme involves an IP delivered password as illustrated in FIG. 5. In this scheme, the CBG 10 generates a unique one-time session password and delivers it to the user's terminal 32 as an IP message over the web interface. The user types in this password on the phone 30 and sends it to the CBG 10 as a mobile originated SMS or as a USSD message.

In the case of an SMS message, the message is sent to the CBG ID. In the case of a USSD message, the user presses a few identifying keys followed by a password, e.g., #112*password*#, where 112 is the service type that is created specifically for the CBG. Note that to support the USSD, the CBG connects to the USSD servers in the WAN network. The USSD server receives the USSD message, which is identified by the special codes. It recognizes that the message is for the CBG through the special code and delivers it to the CBG along with the IMSI of the phone from which this message is sent. The CBG receives this information from the USSD server and validates that the received response matches what was sent out. This validates the user.

One advantage to using the USSD to deliver the password is that the USSD can work with roaming users since it communicates with the HLR. In addition, the USSD is supported on all phones and requires a simple sequence of keys to be pressed.

Figure 6:
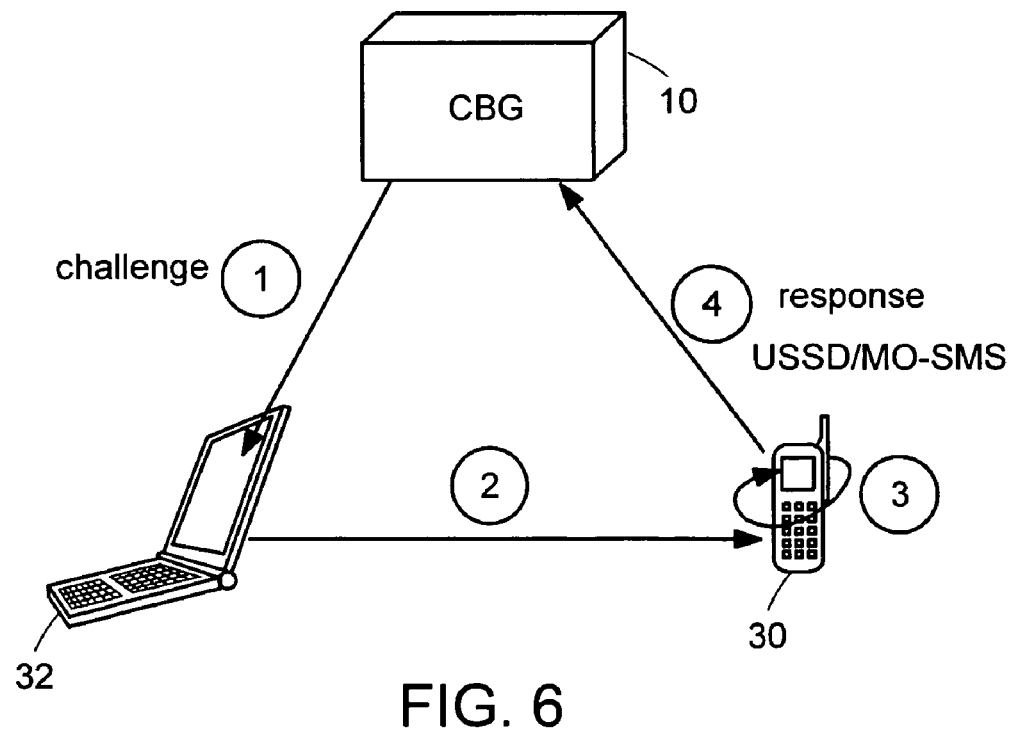
FIG. 6 is a simplified diagram illustrating yet another possible CBG two-factor authentication scheme in accordance with some embodiments of the invention.

A third possible approach involves using the SIM as token generator as illustrated, e.g., in FIG. 6. In this approach, the SIM on the phone 30 is used to generate a secure token. The CBG 10 generates a unique per-session key and delivers it to the user's terminal 32. The phone 30 is equipped with a special CBG application developed using the SIM API toolkit. Specifically, this application is designed to respond to some keystrokes from the phone. In this case, the user enters a sequence on the phone 30 and passes the token received from the CBG 10. The SIM application, in turn, processes this token and generates a key. This response can be conveyed to the CBG 10 in one of two ways. One option is to display the response on the phone 30 so that the user reads it and types it back on the terminal 32 to send to the CBG over IP. The other alternative is for the SIM application itself to send the response back to the CBG 10 through an SMS. In either case, the CBG 10 receives the response and validates the user.

The SIM application can be part of the CBG platform and service and is delivered to the phone using standard SMS mechanisms defined in the GSM standard. The SIM API Toolkit in the GSM standard defines mechanisms to develop such applications and send them to the phone. The SIM application contains a way to receive the token input from the phone's keypad, an algorithm to compute the response, a mechanism to display the result or to send the response as an SMS back to the CBG.

This approach is secure since only those phones that are provisioned for the service have this application on them. Further, there is no easy way to get access to the response generation algorithm on the phone. In addition, USSD is supported on all phones.

Figure 7:
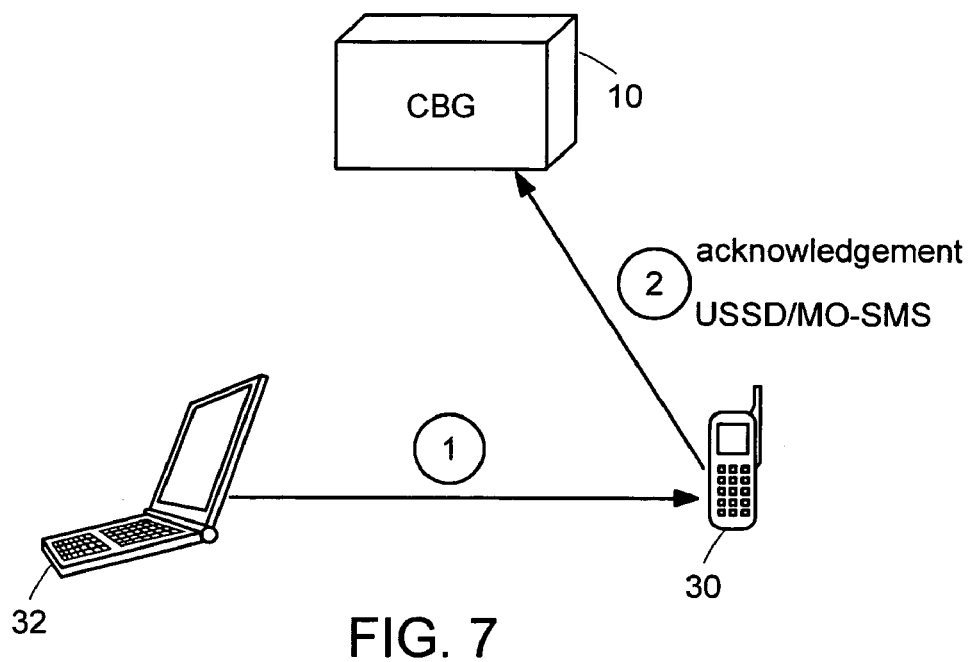
FIG. 7 is a simplified diagram illustrating yet another possible CBG two-factor authentication scheme in accordance with some embodiments of the invention.

A fourth possible approach involves using the phone 30 as an authenticator as illustrated, e.g., in FIG. 7. In this scheme, the user merely sends a USSD message to the CBG 10 after having entered the login and password. This verifies that the user is in possession of the phone 30. Passwords are not sent across to and from the terminal 32 and phone 30. While relatively simple, this method still ensures authenticity by making the user proactively send an acknowledgement to the CBG 10. All this needs on the phone side is the ability to send either a mobile-originated SMS or a USSD message.

Advantages of this approach include ease of use. In addition, use of USSD supports roaming users.

Figure 8:
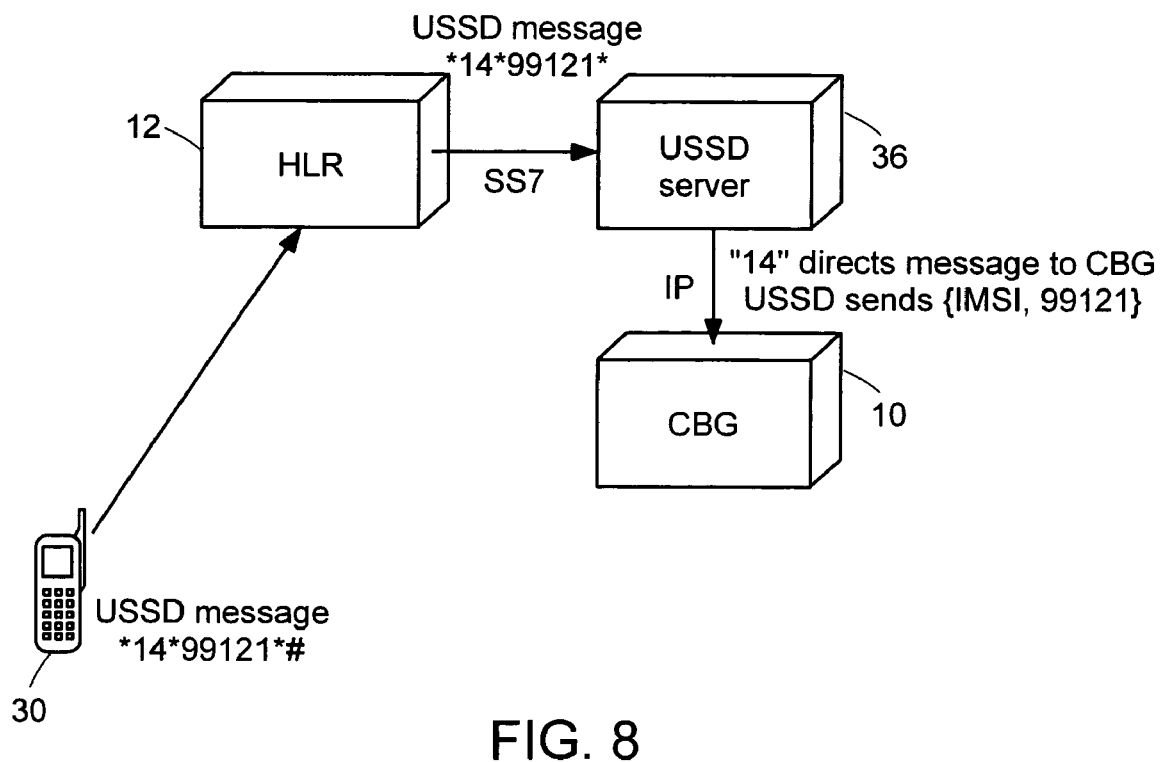
FIG. 8 is a simplified diagram illustrating CBG integration with USSD servers in accordance with some embodiments of the invention.

Some of the phone-SIM authentication schemes involve USSD-based integration as illustrated in FIG. 8. The USSD message from the phone is sent to the HLR 12. The message can be of the type *service ID*information*. The service ID specifies the identification for the specific USSD application. This can be used by the USSD server 36 to determine which USSD application server to forward the request to. In this case, the USSD server 36 sends the data to the CBG 10. The second parameter contains the actual information sent by the user's phone 30. This is sent from the USSD server to the USSD application as an IP message. The USSD server 36 also sends the IMSI of the phone to the USSD application on the CBG 10.

Authentication Integration with Hotspot Architecture

CBG interaction with other authentication systems at the hotspot location is now further described. The hotspot typically has its own authentication infrastructure in place. The CBG is designed to operate with this infrastructure. Most hotspots use a RADIUS server to provide authentication of its users. The RADIUS setup includes two main components: a network access server such as a router at a hotspot and a RADIUS server either at the hotspot or on the Internet. The network access server functions as a RADIUS client.

The authentication process at a RADIUS-enabled hotspot independent of the CBG is described first. This is followed by a discussion of how the CBG fits into such an architecture.

RADIUS Operation

A user comes to a hotspot and starts accessing the Internet through his laptop. The access server at the hotspot, such as, e.g., a Cisco Router or a Nokia Access controller intercepts the session and sends a pre-defined web page to the user. This typically queries the user for a login and a password. The user sends this information to the access server. The access server functions as a RADIUS client. This RADIUS client in turn contacts a RADIUS server located within the network. The RADIUS client sends an Access Request message to the RADIUS server. The message contains the login and password with appropriate encryption. The RADIUS server in turn compares the received password with the information in its local database. Once authenticated, the RADIUS server responds with an Access Response to the RADIUS client.

Integration of CBG with RADIUS

This hotspot configuration can be extended to support users connecting to the CBG. In this case, the users connecting at the hotspot are presented with a selection of their 'domain'. For instance, users may select between ATT and VERIZON as possible authentication domains. This mechanism uses the realm or network access identifier concept of the RADIUS protocol. The user specifies the login and password, in addition to the domain. This information is passed from the RADIUS client to the RADIUS server. The RADIUS server, in turn, looks up its configuration setup to determine how to authenticate users for different domains. The CBGs, installed at the operator premises, typically provide this authentication for those users. The RADIUS server then forwards the authentication request to the appropriate CBG. In this case, the RADIUS server acts as a forwarding proxy and the CBG functions as a remote RADIUS server. The CBG receives the authentication request from the RADIUS server as a RADIUS message. The CBG in turn, authenticates the user by checking its local database. Also, in some cases the CBG may do the additional SIM check or the phone check to get authentication information. Once the user is authenticated, the CBG sends an Access Response to the RADIUS client through the RADIUS server and the user is then authenticated.

Figure 9:
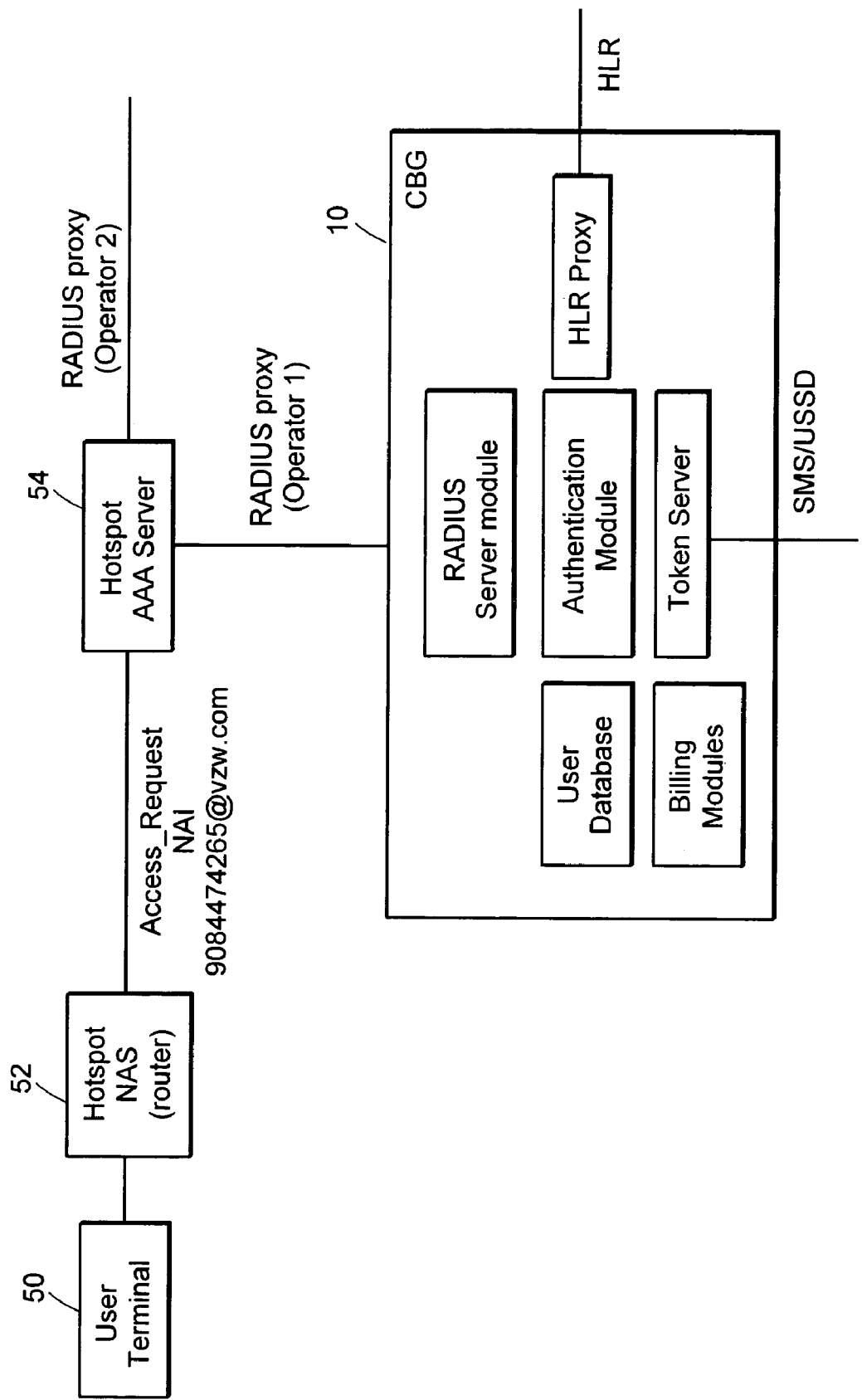
FIG. 9 is a simplified block diagram illustrating a CBG authentication architecture in accordance with some embodiments of the invention.

FIG. 9 illustrates this mechanism. The request from a user terminal 50 goes to the hotspot network access server 52. This access request is then sent to the RADIUS server 54 as user@domain. In this example, the user's login is 212-555-1212 and the domain is vzw.com. When the request arrives at the hotspot RADIUS server, it determines the appropriate CBG 10 to send the request to based on the domain—an ATT user's request is forwarded to the CBG at the ATT location. The CBG 10 is identified through a publicly accessible IP address or domain name. The CBG 10 and the hotspot RADIUS server 54 also maintain their shared secret keys for sending the password and other encrypted information.

As discussed previously, the CBG may do a second level of authentication. For example, in the SIM-enabled terminal scenario, the CBG will retrieve the vector of {RAND, SRES} for this user from the HLR. The CBG will send the RAND challenge to the user's terminal. The SIM on the terminal computes the response and returns the response to the CBG. The CBG compares the received response SRES with the expected response. If the two match, then the CBG enables the user in the second level of authentication. In this case, the CBG acts as a VLR accessing the HLR.

Similarly, in the case where the user's phone is used for authentication, the token server in the CBG generates the unique token and communicates with the user through one of the four mechanisms discussed previously. After the user is validated, the second level of services is enabled for the user.

Note that if no RADIUS server is associated with the hotspot, then the CBG can provide the complete authentication as well by functioning as the RADIUS server. In this case, the CBG can provide support for additional operators through the realm concept described further below.

This architecture is scalable and can support multiple operators serving a single hotspot through the realm concept.

The CBG server 10 can include the following components:

(a) A RADIUS server module to interface with the hotspot RADIUS systems. Note that other schemes such as, e.g., TACACS and DIAMETER can also be similarly supported.

(b) A user database that stores the user profiles and password.

(c) A VLR proxy that connects to the HLR over a SS7 link. This can be used to fetch the authentication vectors for SIM-based authentication.

(d) A token server, which sends the password tokens to the user's phone. This may also interface with a USSD server as described earlier.

Billing Integration

Billing integration is now described, particularly the approach by which the CBG leverages existing hotspot infrastructure to collect accounting information and converts it to a format that can be passed to the WAN operator billing system.

The RADIUS protocol provides a method to collect accounting information. The RADIUS client sends an Accounting Request to the RADIUS server at the beginning and end of the user session. This request passes information regarding the volume of data sent and the duration of the session.

Figure 10:
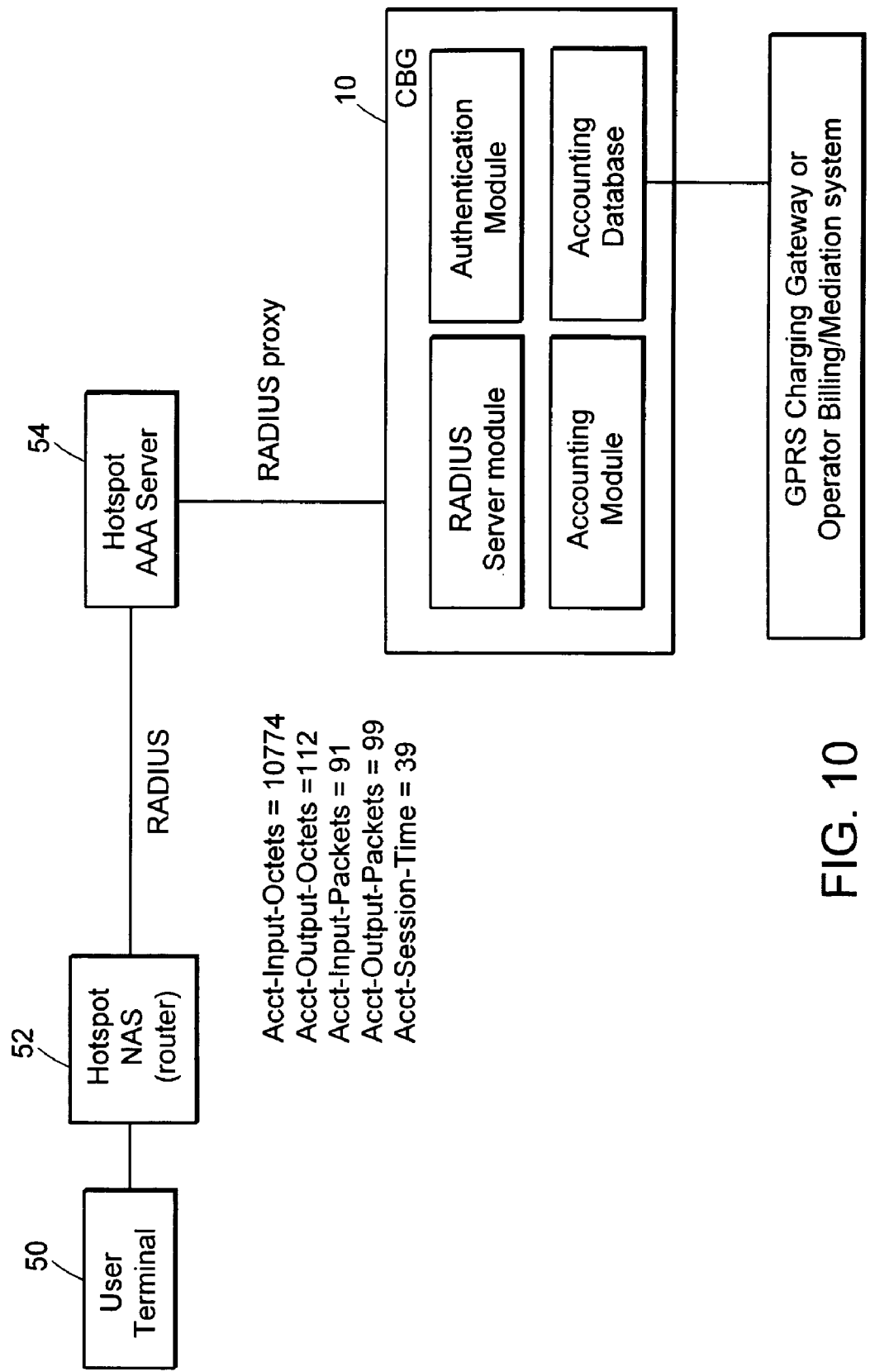
FIG. 10 is a simplified block diagram illustrating a CBG billing integration system in accordance with some embodiments of the invention.

The CBG can function as a remote RADIUS server, and the local RADIUS server sends the accounting messages over to the CBG. The CBG then processes this information and generates accounting information in a form suitable for WAN billing systems. FIG. 10 illustrates this billing integration system. The RADIUS client at the hotspot sends an Accounting message to the RADIUS server 54, which forwards it to the remote CBG 10. As shown, this message includes information such as the number of bytes sent on the input and output interfaces as well as the duration of the session.

The CBG billing components can include:

(a) A RADIUS server that receives this accounting information.

(b) An accounting module that converts this information to an appropriate format.

(c) An accounting database that stores accounting information.

The CBG interfaces with the operator billing systems in one of several ways, including the following:

(a) The CBG generates GPRS-compatible usage information. This is sent to a GPRS charging gateway, similar to other GPRS elements such as the SGSN and GGSN. This enables the operator to leverage its existing GPRS infrastructure to generate the integrated bill. Further details of this system will be described below in connection with FIG. 11.

(b) Alternately, the CBG may generate charging information in a standard format, such as IPDR. In this case, operator's existing billing or mediation systems can collect this IPDR information as if they were collecting it from other network elements.

(c) The CBG may also generate usage information in flat comma separated files or XML files that can be formatted to connect to generally any billing system. For example, a billing system by Portal can accept usage information in a flat file and send it to the final operator systems.

(d) The CBG may also generate TAP3 compatible records that are typically used for GSM roaming.

The CBG itself preferably does not generate any billing information. The CBG collects usage information and couples to the operator's existing billing entities that use this usage information to generate the final bill. The actual rating is done by the operator's existing systems.

Figure 11:
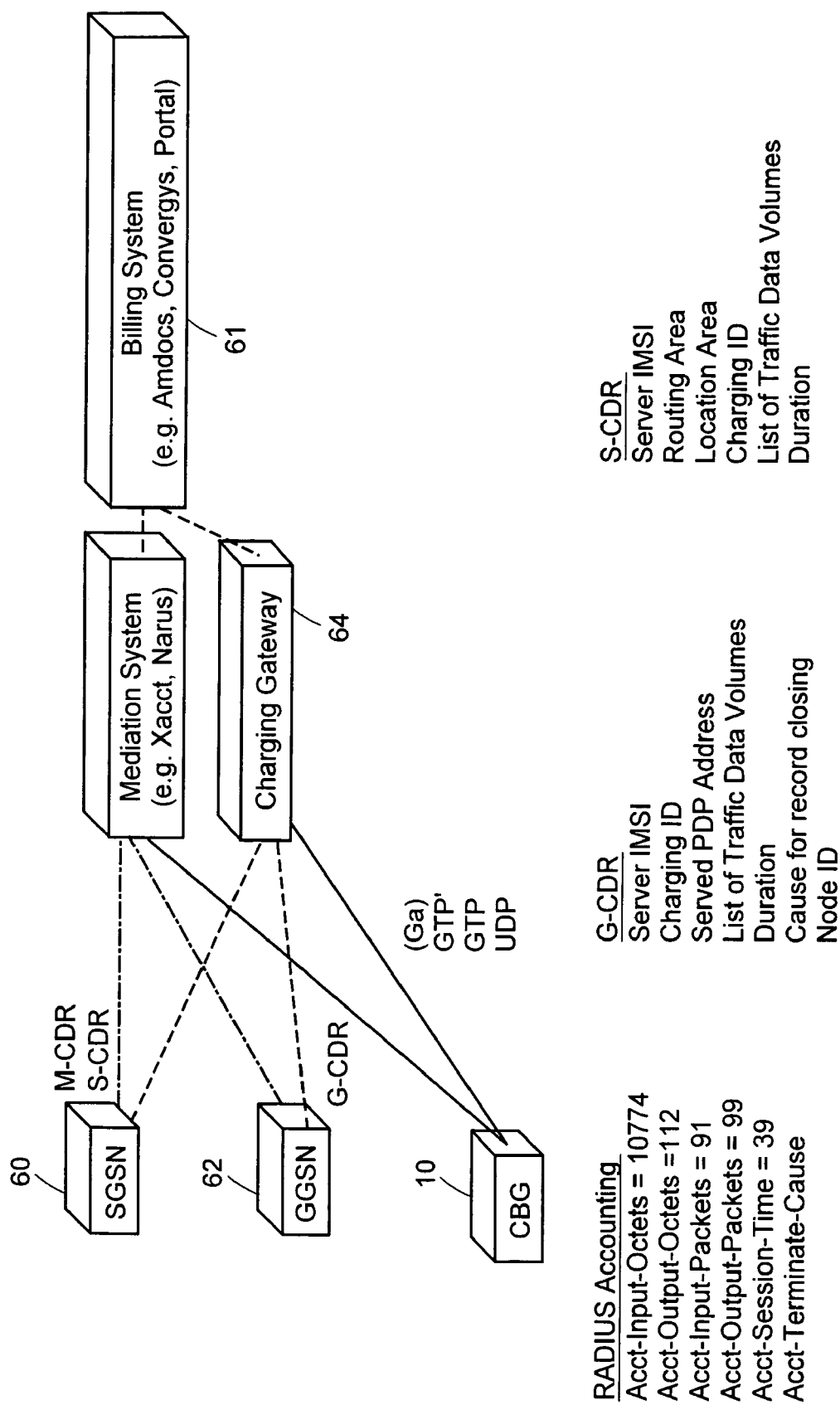
FIG. 11 is a simplified diagram illustrating a CBG integrated with a GPRS charging gateway in accordance with some embodiments of the invention.

FIG. 11 illustrates the integration of the CBG 10 with the GPRS billing system 61. As mentioned earlier, the SGSN 60 and GGSN 62 within the GPRS network typically generate usage information using the GTP' protocol, as defined by the GPRS standard 12.15. The CBG 10 is designed to function as another GPRS network element, from the GPRS network point of view. As shown in FIG. 11, the CBG 10 collects RADIUS accounting information and converts it to the GPRS format. The figure shows the main usage parameters collected and generated. The connection between the CBG 10 and the charging gateway 64 is typically IP. The charging information sent over the GTP' protocol is sent over UDP, as defined by the standard.

The GPRS billing format supports different charging records generated within the SGSN and the GGSN. Table 1, which follows, shows various different parameters in the GPRS charging records and the corresponding information that can be collected for the CBG. The G-CDR indicates the metrics collected by the GGSN and S-CDR indicates metrics collected by the SGSN. The right most column indicates the corresponding information generated by the CBG. Note that if the field is blank, it is not used. The letters M, C, and O, are mandatory, conditional and optional, respectively. Fields italicized are also in the S-CDR. Underlined fields are used in the CBG.

Of interest is the field Node ID in the G-CDR. This can be used to specify that the usage information was collected by the CBG. This information can be used by the operator's billing systems to apply a different policy to LAN usage, if desired.

| Field | | Description | CBG Usage |
|---|---|---|---|
| Record Type | M | GPRS GGSN PDP context record. | G-CDR type |
| Network initiated PDP context | C | Present if this is a network initiated PDP context. | |
| Anonymous Access Indicator | C | Set to true to indicate anonymous access (and that the Served IMSI is not supplied). | |
| Served IMSI | M | IMSI of the served party (if Anonymous Access Indicator is FALSE or not supplied). | IMSI |
| GGSN Address | M | The IP address of the GGSN used. | Router Address |
| Charging ID | M | PDP context identifier used to identify this PDP context in different records created by GSNs | A unique ID created by the CBG |
| SGSN Address | M | List of SGSN addresses used during this record. | This is an ASN.1 SEQUENCE. |
| Access Point Name Network Identifier | M | The logical name of the connected access point to the external packet data network (network identifier part of APN). | e.g., providername.com |
| APN Selection Mode | O | An index indicating how the APN was selected. | |
| PDP Type | M | PDP type, e.g. X.25, IP, PPP, or IHOSS:OSP | IP |
| Served PDP Address | M | PDP address, e.g. an IPv4, IPv6 or X.121. | IP Address assigned to WLAN endpoint |
| Remote PDP Address | O | List of PDP addresses of the remote host or DTE e.g. an IPv4, IPv6, or X.121 (Included if the PDP type is X.25) | |
| Dynamic Address Flag | C | Indicates whether served PDP address is dynamic, that is allocated during PDP context activation. | |
| List of Traffic Data Volumes | M | A list of changes in charging conditions for this PDP context, each time stamped. Charging conditions are used to categorize traffic volumes, such as per tariff period. Initial and subsequently changed QoS and corresponding data values are listed. Data volumes are in octets above the GTP layer and are separated for uplink and downlink traffic. | This is the actual octet counts for both directions. |
| Record Opening Time | M | Time stamp when this record was opened. | Timestamp |
| Duration | M | Duration of this record in the GGSN. | Duration |
| Cause for Record Closing | M | The reason for the release of record from this GGSN. | PDP Context Release (same as logoff) |
| Diagnostics | O | A more detailed reason for the release of the connection. | |
| Record Sequence Number | C | Partial record sequence number, only present in case of partial records. | Might use this |
| Node ID | O | Name of the recording entity. | This field contains an optional operator configurable identifier string for the node which generated the CDR Used to identify CBG |
| Record Extensions | O | A set of network/manufacturer specific extensions to the record. | |
| Local Record Sequence Number | O | Consecutive record number created by this node. The number is allocated sequentially including all CDR types. | |
| Record Type | M | GPRS SGSN PDP context record. | S-CDR type |
| Network Initiated PDP Context | C | Present if this is a network initiated PDP context. | |
| Anonymous Access Indicator | C | Set to true to indicate anonymous access (and that the Served IMSI is not supplied) | |
| Served IMSI | M | IMSI of the served party (if Anonymous Access Indicator is FALSE or not supplied). | IMSI |
| Served IMEI | C | The IMEI of the ME, if available. | |
| SGSN Address | M | The IP address of the current SGSN. | |
| MS Network Capability | O | The mobile station Network Capability. | |
| Routing Area | O | Routing Area at the time of the record creation. | Could use an unused routing area code and location area code to specify CBG |

-continued

| Field | | Description | CBG Usage |
|---|---|---|---|
| Local Area Code | O | Location area code at the time of the record creation. | Could use an unused routing area code and location area code to specify CBG |
| Cell Identity | O | Cell id at the time of the record creation. | |
| Charging ID | M | PDP context identifier used to identify this PDP context in different records created by GSNs | A unique ID created by the CBG |
| GGSN Address Used | M | The IP address of the GGSN currently used. The GGSN address is always the same for an activated PDP. | Could use the router address |
| Access Point Name Network Identifier | M | The logical name of the connected access point to the external packet data network (network identifier part of APN). | e.g., providername.com, see GSM 03.03 |
| APN Selection Mode | O | An index indicating how the APN was selected. | |
| PDP Type | M | PDP type, e.g. X.25, IP, PPP, IHOSS:OSP | IP |
| Served PDP Address | M | PDP address of the served IMSI, e.g. an IPv4, IPv6 or X.121. | IP Address assigned to WLAN endpoint |
| List of Traffic Data Volumes | M | A list of changes in charging conditions for this PDP context, each time stamped. Charging conditions are used to categorize traffic volumes, such as per QoS/tariff period. Initial and subsequently changed QoS and corresponding data values are listed. Data volumes are in Octets above the SNDCP layer and are separated for uplink and downlink traffic. | This is the actual octet counts for both directions. |
| Record Opening Time | M | Time stamp when PDP context activation is created in this SGSN or record opening time on following partial records | Time |
| Duration | M | Duration of this record in the SGSN. | Duration |
| SGSN Change | C | Present if this is first record after SGSN change. | |
| Cause for Record Closing | M | The reason for the release of record from this SGSN. | PDP Context Release (same as logoff) |
| Diagnostics | O | A more detailed reason for the release of the connection. | |
| Record Sequence Number | C | Partial record sequence number in this SGSN. Only present in case of partial records. | Might use this |
| Node ID | O | Name of the recording entity | This field contains an optional operator configurable identifier string for the node which generated the CDR. Can use this to identify CBG |
| Record Extensions | O | A set of network/manufacturer specific extensions to the record. | |
| Local Record Sequence Number | O | Consecutive record number created by this node. The number is allocated sequentially including all CDR types. | |
| Access Point Name Operator Identifier | M | The Operator Identifier part of the APN. | See GSM 03.03 |

Security

Figure 12:
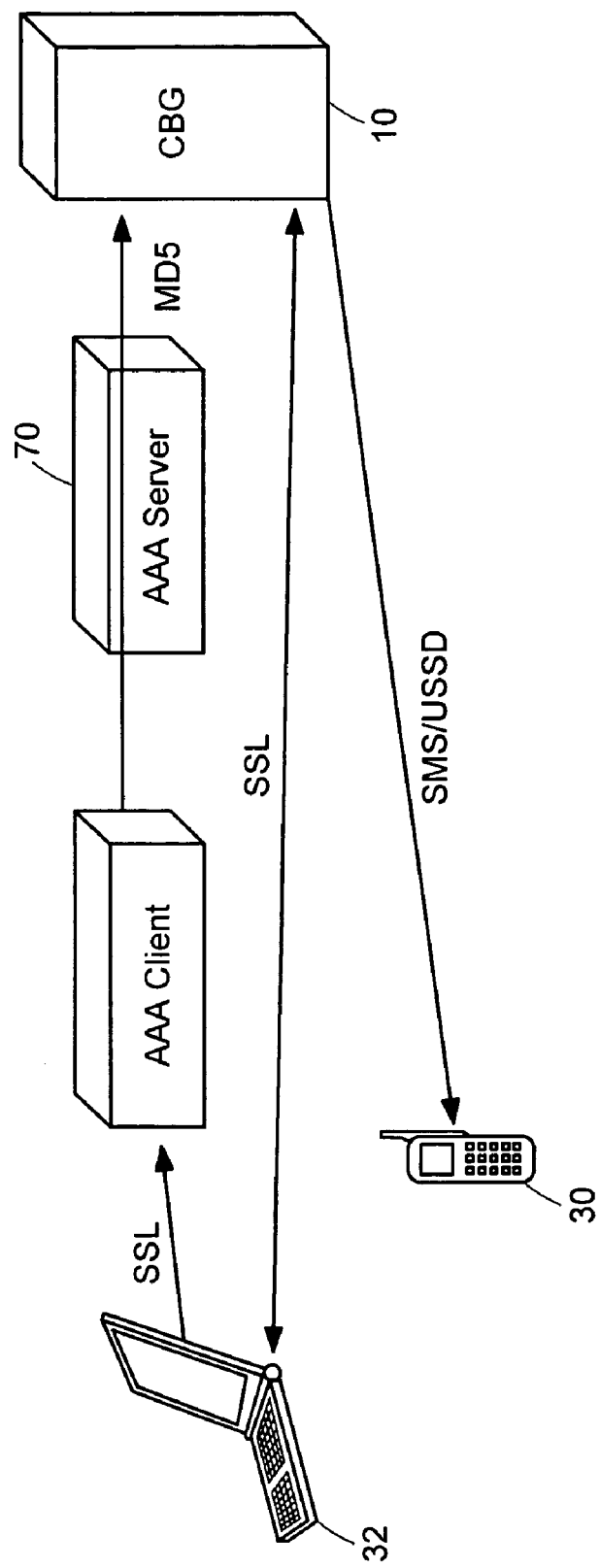
FIG. 12 is a simplified diagram illustrating security interfaces in accordance with some embodiments of the invention.

The security mechanisms supported in the CBG 10 are illustrated in FIG. 12. The login/password exchanged between the laptop 32 and a hotspot 'AAA' server 70 (which manages authentication, authorization and accounting functions, e.g., a RADIUS server) can use MD5 encryption. The shared secret between the CBG and the AAA server is set up by the hotspot operator and the wireless WAN operator. For other exchanges such as the typed password between the laptop and the CBG, SSL encryption is used. The SMS or USSD messages use the encryption mechanisms within the GPRS/GSM infrastructure. Further, the AAA server and the CBG may exchange information through an encrypted tunnel using IPSec, for example. The AAA server and CBG can also be setup for mutual authentication through certificates to avoid rogue devices.

Shared Hotspot Support

Since the 802.11 spectrum is in the unlicensed band, it is likely that multiple operators would want to share a given deployment at a hotspot to support their users. There are several business models in this scenario. One possibility is where one operator deploys and maintains the hotspot equipment and the other establishes the roaming agreement. Another possibility is one where a neutral systems integrator maintains this hotspot and none of the operators actually owns the equipment at the hotspot. Different business models apply in these different cases.

The CBG supports multiple business models and allows the users to roam across different 802.11 islands. The CBG uses the mechanisms within the RADIUS protocol to provide this roaming support. This also makes it possible to support multiple operators within a given hotspot location.

Figure 13:
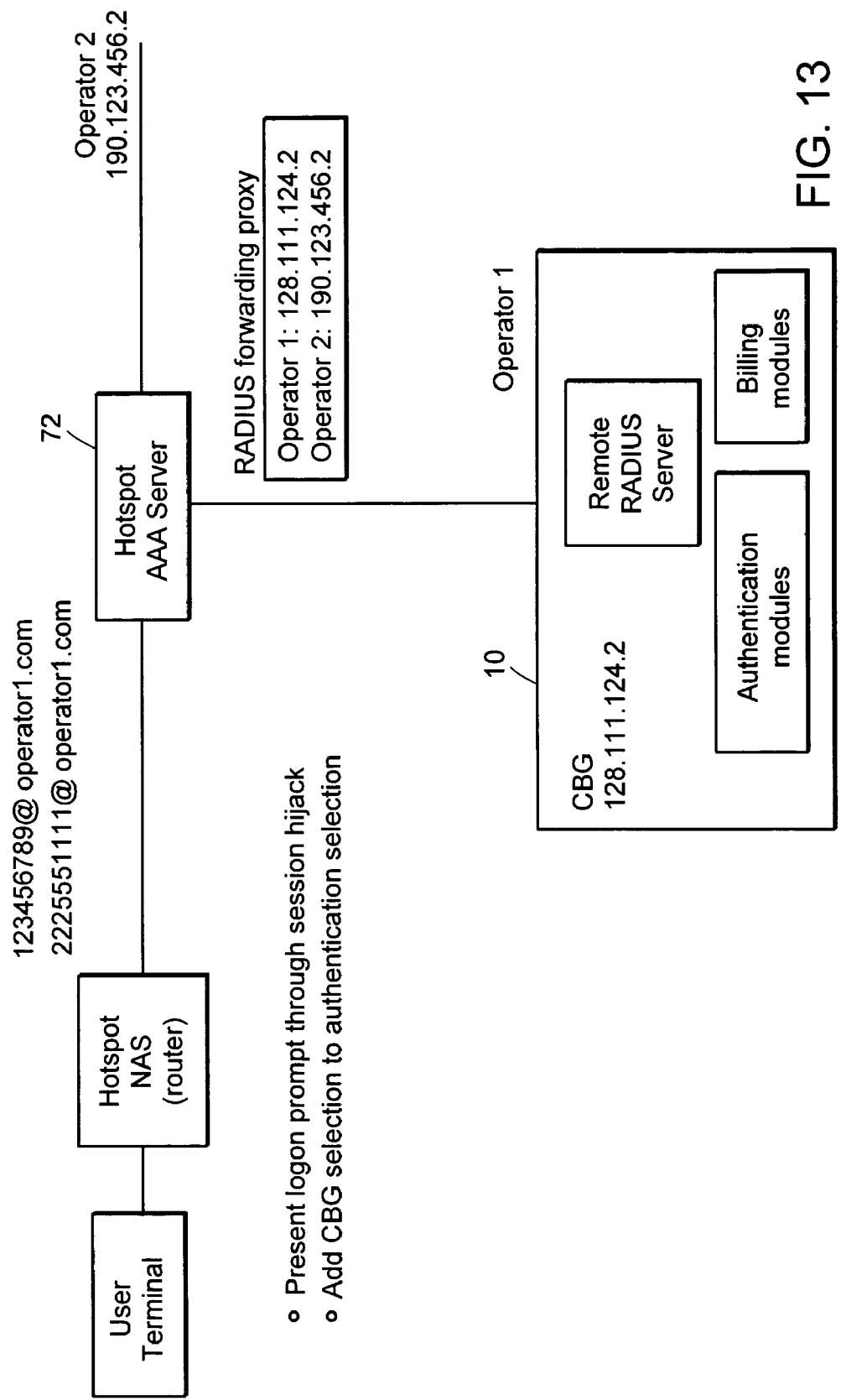
FIG. 13 is a simplified diagram illustrating CBG support for multiple operators at a hotspot in accordance with some embodiments of the invention.

FIG. 13 illustrates the system architecture for a typical hotspot deployment that supports multiple operators. Suppose that operator 1 and operator 2 provide service within the hotspot. The RADIUS server 72 presents the operators' options for the realm selection at the hotspot. Depending on the selected realm, the RADIUS server 72 contacts the appropriate CBG 10.

Another aspect of the unlicensed spectrum is that if multiple operators deployed their own equipment, it could lead to interference unless the spectrum is shared effectively.

In the 802.11b space at 2.4 GHz, there are three non-overlapping channels. Thus, it is possible for three operators to deploy equipment within one region provided they agree on which channels to pick. This places a requirement on the user's terminal to be able to select the correct operator's equipment.

One way to accomplish this is outlined next. Each operator selects its channel and assigns an ESSID (extended service set ID, as defined by the 802.11b standard) to its access points (APs). Thus, all the APs owned by operator 1 will be set to ESSID OP1 and all APs owned by operator 2 would be set to ESSID OP2. Each AP broadcasts its ESSID. The client software on the user's terminal maintains a list of 'preferred' network ID's (similar to preferred roaming partners stored in the SIM card for the GSM roaming network). The client when associating with a given AP would use this information.

CBG Components

A typical architecture of the CBG is now described in further detail. As mentioned earlier, the CBG comprises two key components: the client and the server.

CBG Server

Figure 14:
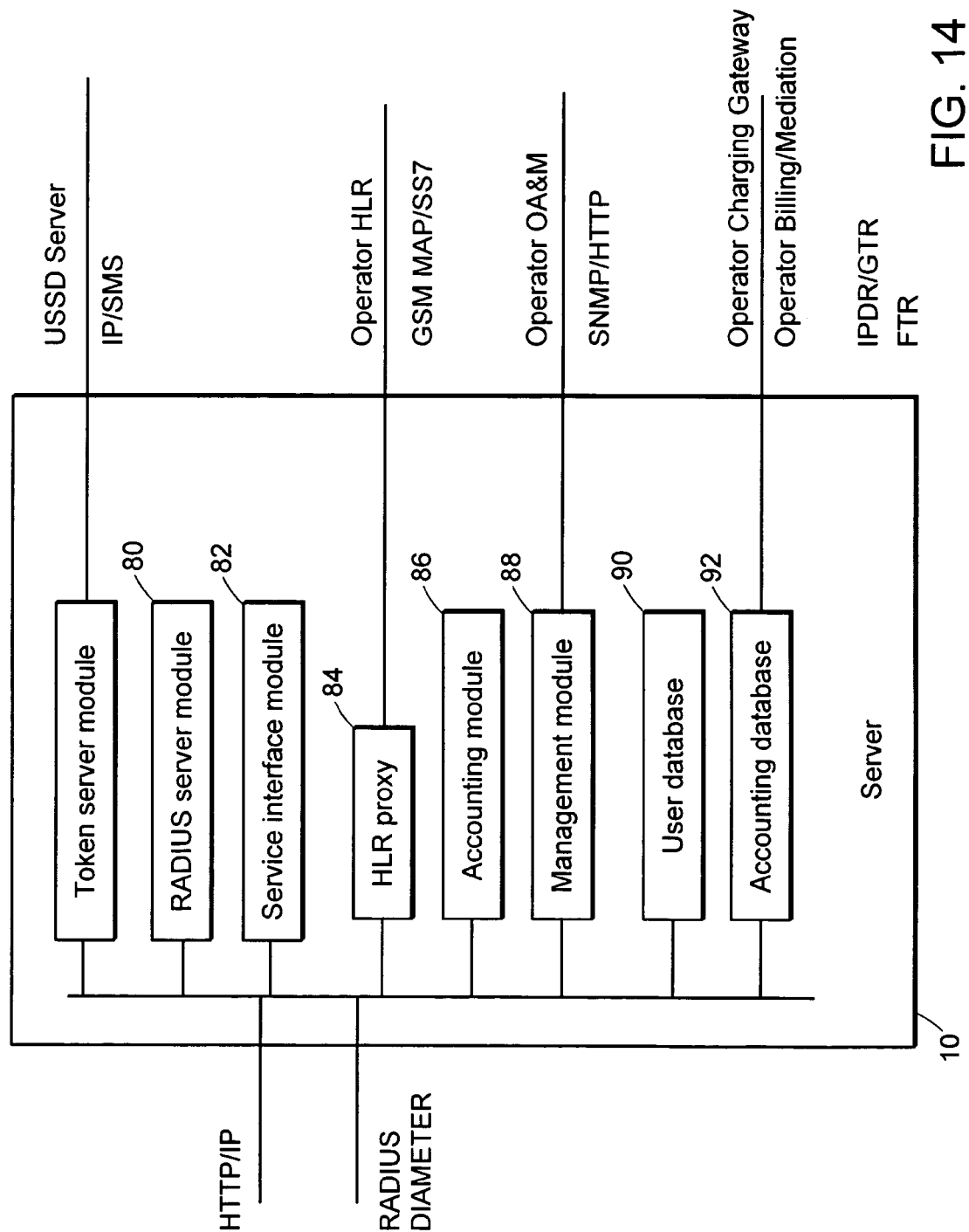
FIG. 14 is a simplified diagram illustrating a CBG Server in accordance with some embodiments of the invention.

FIG. 14 illustrates the main components of the CBG server 10. The CBG server is preferably hosted in the operator's network.

The RADIUS server module 80 implements a standard RADIUS protocol and interfaces with the RADIUS server in the hotspot network. It can also implement other protocols such as DIAMETER.

The Service interface module 82 is responsible for providing the interface that manages run-time login for users. This module queries the user for authentication information, receives the encrypted information, queries the appropriate database or the HLR proxy 84 to verify the authentication, and enables service.

The HLR proxy module 84 is responsible for generating the authentication information. This module interfaces with the HLR to get the authentication information.

The accounting module 86 is responsible for collecting usage information from the CBG client and generating an appropriate format that the operator's billing and mediation systems can process.

The management module 88 presents the management interface for the operator. It allows the different CBG components to be controlled remotely. Typical interfaces would be SNMP and HTTP.

The user database module 90 is the local CBG database that contains user specific information. This module also provides a mechanism for operators to introduce special policies and service-specific features.

The accounting database module 90 collects the usage information generated by the accounting module. It provides an interface for the operator's systems to collect this information. Typical interfaces can be FTP and FTAM.

The token server module is responsible for sending out the token/password through SMS or USSD, as described previously.

CBG Client

The CBG client is an optional module, and is used generally only when the user's terminal has a SIM reader or SIM card. It can also be optionally used to measure usage information.

Hotspot LAN Configurations

Typical configurations of hotspot locations from which the user may access data are described below.

Hotspot with a Building Broadband Service Manager

Figure 15:
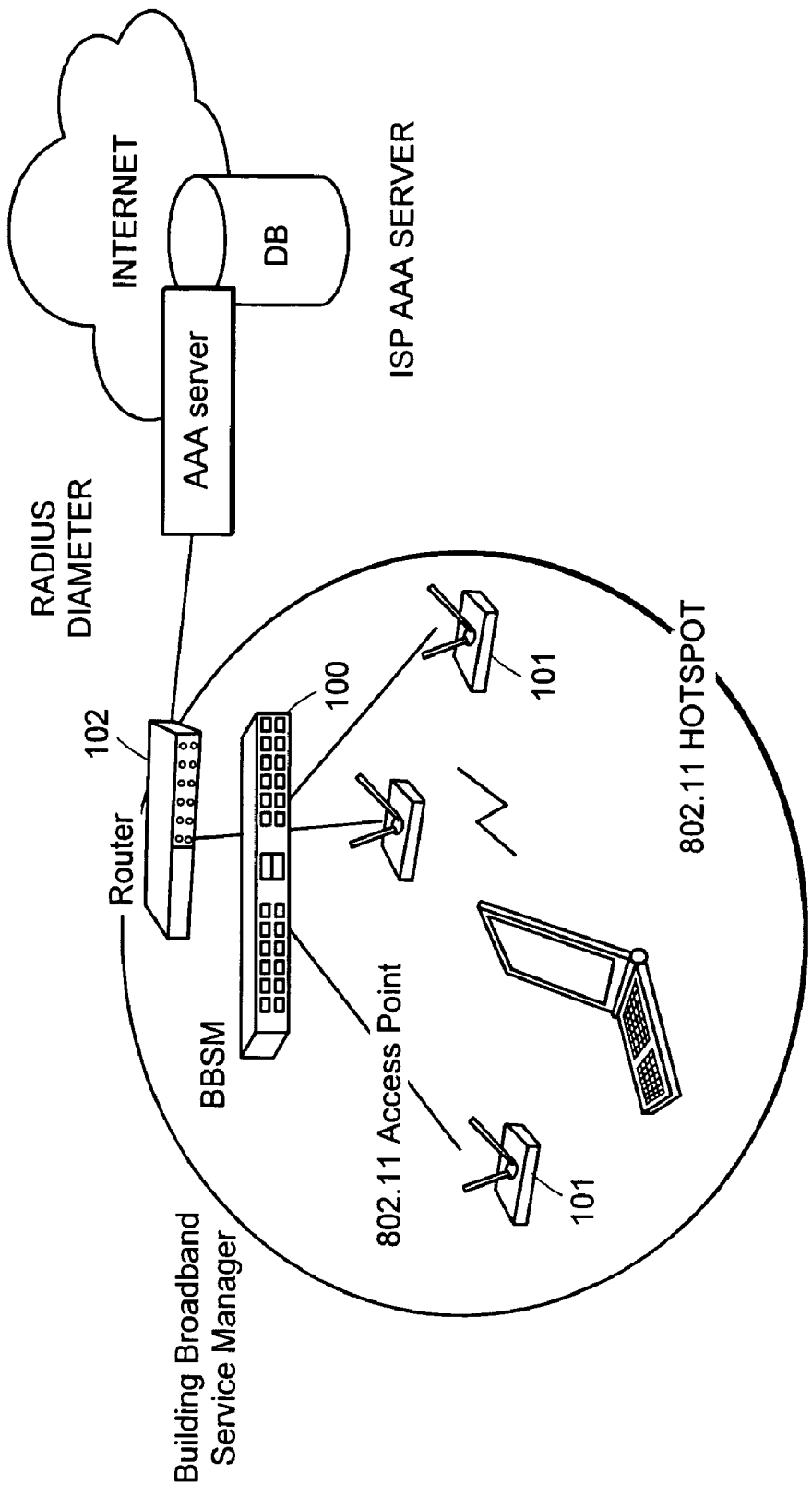
FIG. 15 is a simplified diagram illustrating a hotspot architecture using a BBSM in accordance with some embodiments of the invention.

A typical hotspot such as an airport typically has several 802.11b access points 101. These access points are connected through a router to the public Internet. Typical access control equipment is the Building Broadband Service Manager (BBSM) available from Cisco. (FIG. 15 shows a typical hotspot with the BBSM 100.) This allows the hotspot operator to block access to the router 102 until the user has been authenticated. Specifically, the BBSM 100 presents the user with login request; the request is passed to an authentication server over a protocol like RADIUS. The authentication server may be located at the hotspot itself or anywhere else on the public Internet. When the authentication request is granted, the BBSM 100 informs the router 102 to allow the traffic to go through.

A BBSM-enabled hotspot can be modified to support CBG-based WAN authentication by the addition of a simple script to the BBSM. This script allows WAN-user requests to be forwarded to the appropriate CBG, depending on the carrier that the user belongs to. When authentication requests come to BBSM, it asks the user to select the WAN operator and passes the request to the appropriate CBG.

Coffee Shop Subscribing to a Wireless ISP Roaming Service

Another popular method of providing 802.11 service is by deploying APs at smaller areas such as, e.g., coffee shops. In this case, typically one or two APs 101 are deployed at a coffee shop. To provide access control, the WISP maintains authentication centers within its backbone, since it is not economical to deploy access control at each physical location. Typical equipment used includes, e.g., the Nokia public access zone controller. When a subscriber tries to start accessing the Internet, the request is blocked until he is authenticated. The authentication request goes to the access controller. The access controller presents the subscriber with a login request. The user's response is sent to its authentication database. Once authenticated, the user is allowed to start using the service.

One design issue is related to supporting multiple operators within a given hotspot. Since the 802.11b network uses unlicensed spectrum, it is not possible for multiple operators to provide their own infrastructure in a given region due to interference. This leads to a natural accessing sharing architecture, where one entity deploys the infrastructure and others share it.

To address this access sharing issue, wireless ISPs are setting up a wireless ISP roaming initiative (WISPR) that allows ISPs to offer roaming services. In this case, a user who is a subscriber of a different WISP can access the Internet from a foreign ISP's network and get charged roaming fees. To implement this, the user comes to a foreign WISP network and tries to access the network. The user is queried for login information regarding his home 'realm'. The access controller contacts the appropriate home authentication center to authenticate the user. Subsequently, the two ISPs settle charges for roaming users.

Figure 16:
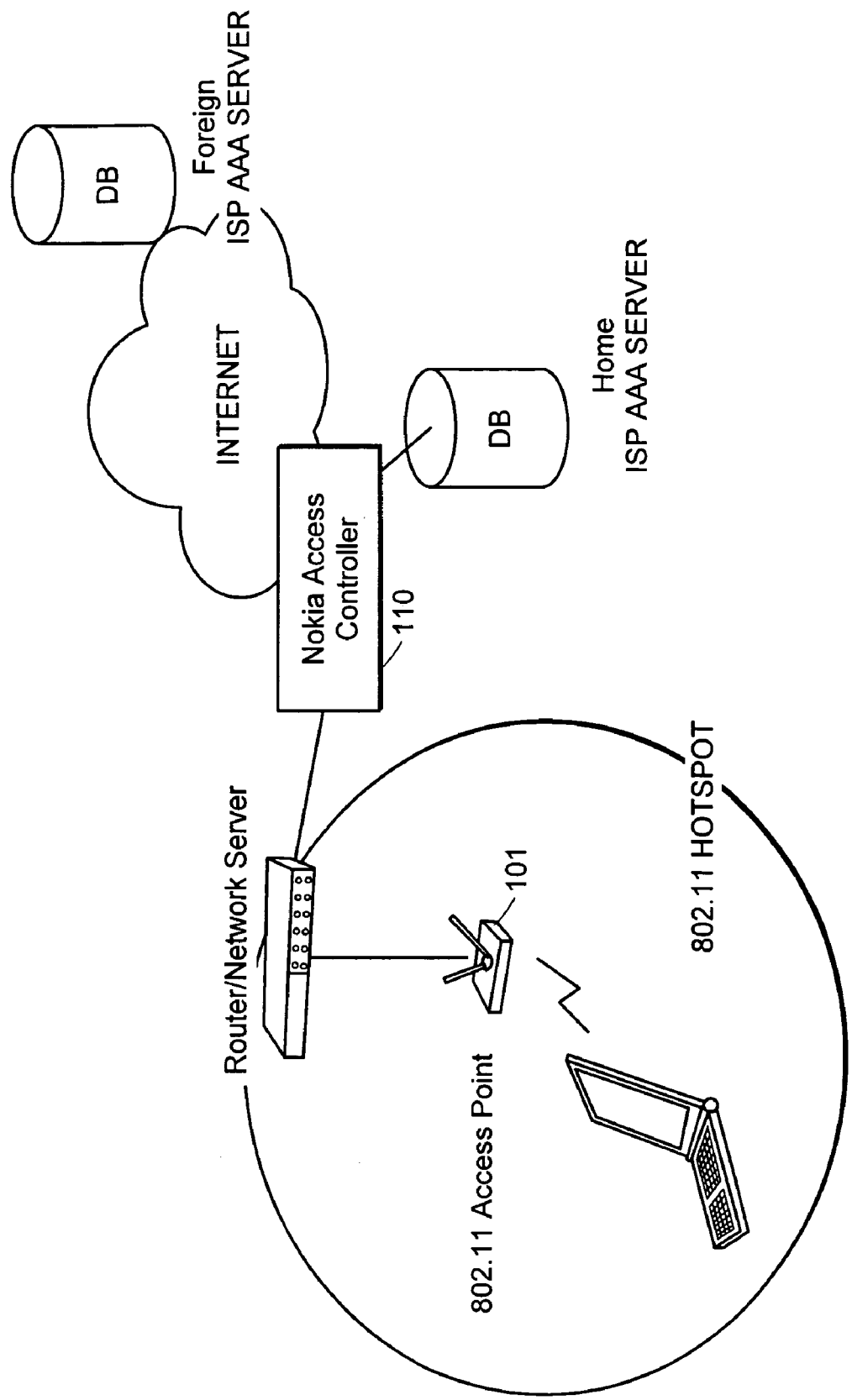
FIG. 16 is a simplified diagram illustrating a hotspot setting using a wireless roaming arrangement and deploying an access controller in the network in accordance with some embodiments of the invention.

FIG. 16 shows a typical configuration of a hotspot setting using a wireless roaming arrangement and deploying an access controller 110 in the network.

A WISPR-enabled hotspot can be modified to support CBG-based WAN authentication by the addition of a simple script to the WISP access controller. This script allows WAN-user requests to be forwarded to the appropriate CBG, depending on the carrier that the user belongs to. So the access controller asks the user to select the WAN operator and passes the request to the appropriate CBG.

Hotspot Enabled with iPass Roaming Service

Another popular way of deploying wireless LAN access is through the use of a clearinghouse like iPass or GRIC. In this case, the hotspot contains one or more access points 101 that are connected to the Internet through a router 113. Authentication is now managed through the clearinghouse. This allows multiple ISPs to share a single infrastructure and yet provide different services to their users.

Typically, the subscriber has an account with iPass. IPass, in turn, negotiates multiple partnerships with different enterprises as well as with different hotspot operators and ISPs. IPass deploys a network access server at the hotspot location. The network access server sends all authentication requests to an iPass transaction center. The transaction center looks at the user's login and determines who the authentication entity is. The authentication request is sent to the iPass Roam Server 111 in the appropriate enterprise. This communicates with the enterprise authentication servers. The user is authenticated and the request is allowed to go through. The network server and transaction center keep track of each user's usage and generate the appropriate bills.

Figure 17:
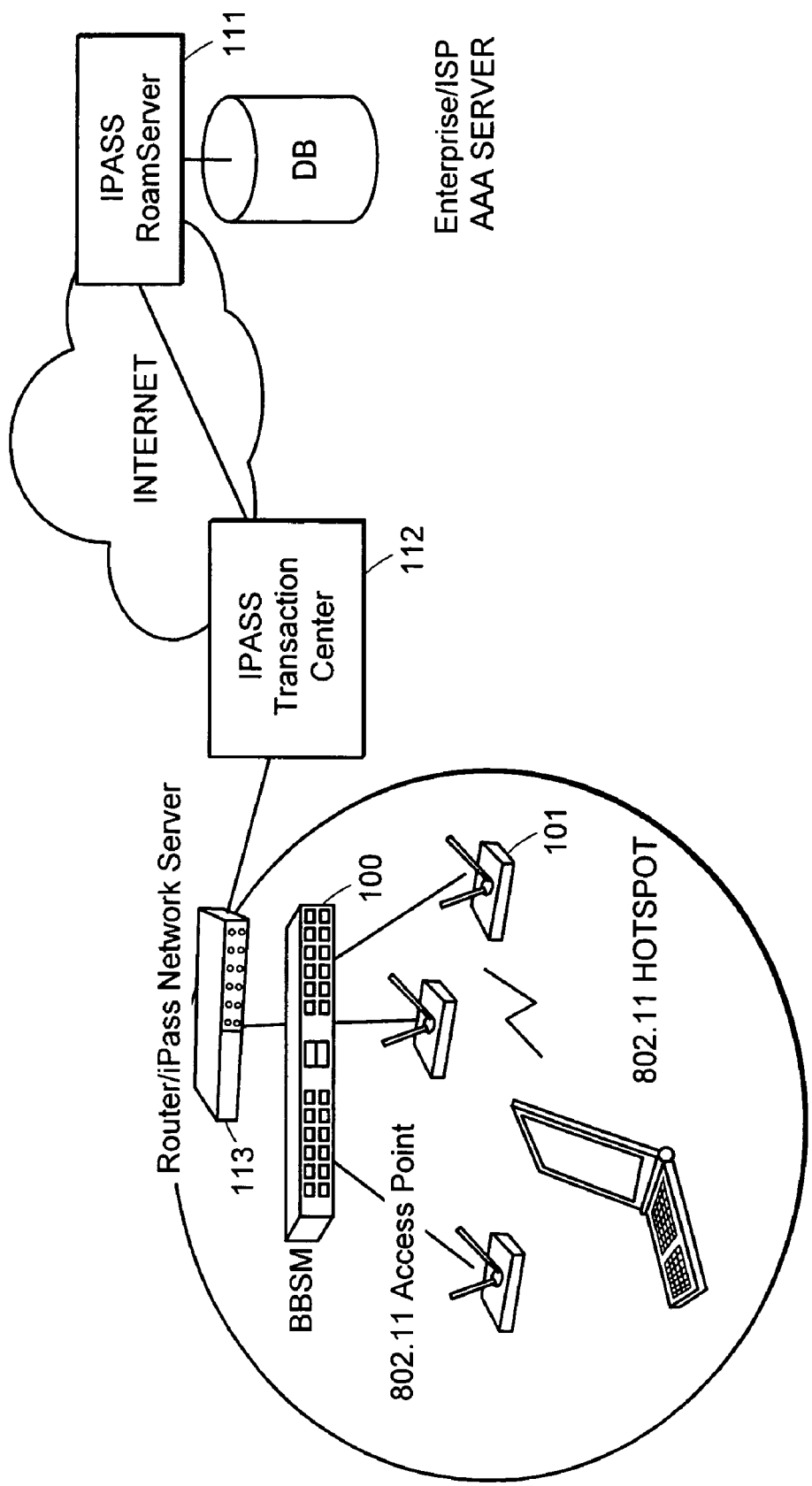
FIG. 17 is a simplified diagram illustrating a hotspot configuration with iPass system in accordance with some embodiments of the invention.

FIG. 17 shows a typical configuration using iPass 112. The use of a BBSM 100 is optional in such a setting.

An iPass-enabled hotspot can be modified to support CBG-based WAN authentication by the addition of a simple script to the iPass transaction center. This script allows WAN-user requests to be forwarded to the appropriate CBG, depending on the carrier that the user belongs to. So the CBG is another authentication center from the view of the iPass transaction center. An iPass roam server is deployed at the CBG to provide any desired protocol conversion between iPass and standard radius protocols.

Kiosk-based Internet Access

Figure 18:
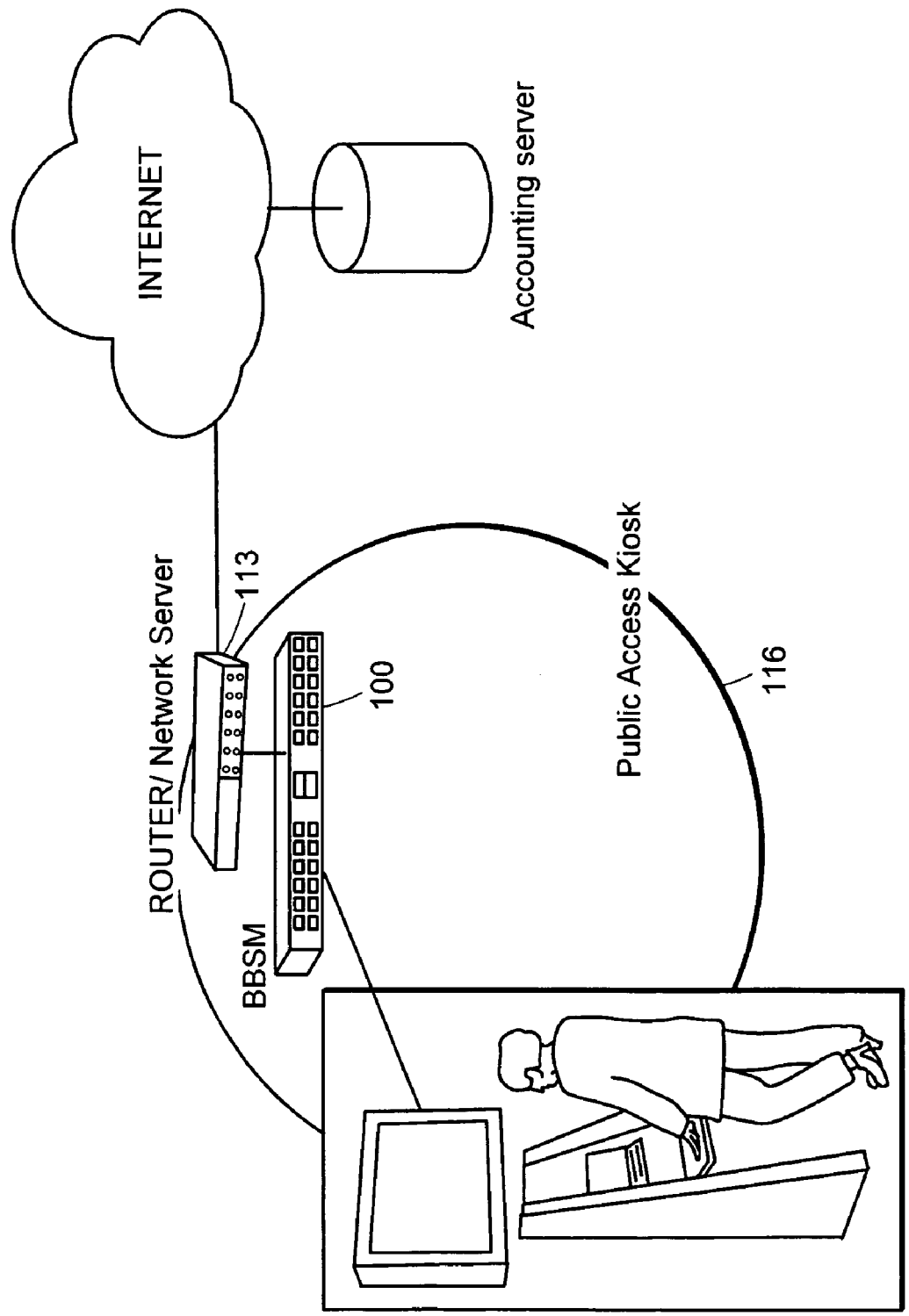
FIG. 18 is a simplified diagram illustrating kiosk-based Internet access in accordance with some embodiments of the invention.

Another popular method of providing Internet access at public hotspots is through Internet kiosks. FIG. 18 shows a typical kiosk system 116. In this case, the user is not required to take his terminal, but can use existing terminals deployed at the public locations. In this setting, the kiosk operator connects the kiosks to an access controller, which then allows Internet access. The access controller requests account/credit card information from the user. It contacts the appropriate accounting entity to charge the user. The BBSM 100 described earlier is one such access control device.

A kiosk-based hotspot can be modified to support CBG-based WAN authentication by the addition of a simple script to the controller in the kiosk. This script allows the kiosk to query for WAN-based users. The WAN-user requests are forwarded to the appropriate CBG, depending on the carrier that the user belongs to.

802.1X Support

For 802.1x support, the access server is not required. In this case, the 802.1x enabled access point blocks user access and has the embedded RADIUS client that exchanges authentication information with the CBG/RADIUS server.

Service Signup Call Flows

Call flows are now described for different service signup scenarios for the first authentication mechanism where the operator database is used to login and the LAN login/password is used for service usage. Note that the WAN subscriber can sign up for LAN service from various places such as, e.g., from home, from an airport, or from a coffee shop. These access mechanisms can be different and require different call flows. The system architecture of the CBG and the CBG client do not change in any of these cases. Note also that these are specific non-limiting examples to illustrate how the CBG supports different scenarios.

As mentioned earlier, the service signup call flow is typically executed only once for each user during subscription sign up.

Figure 19:
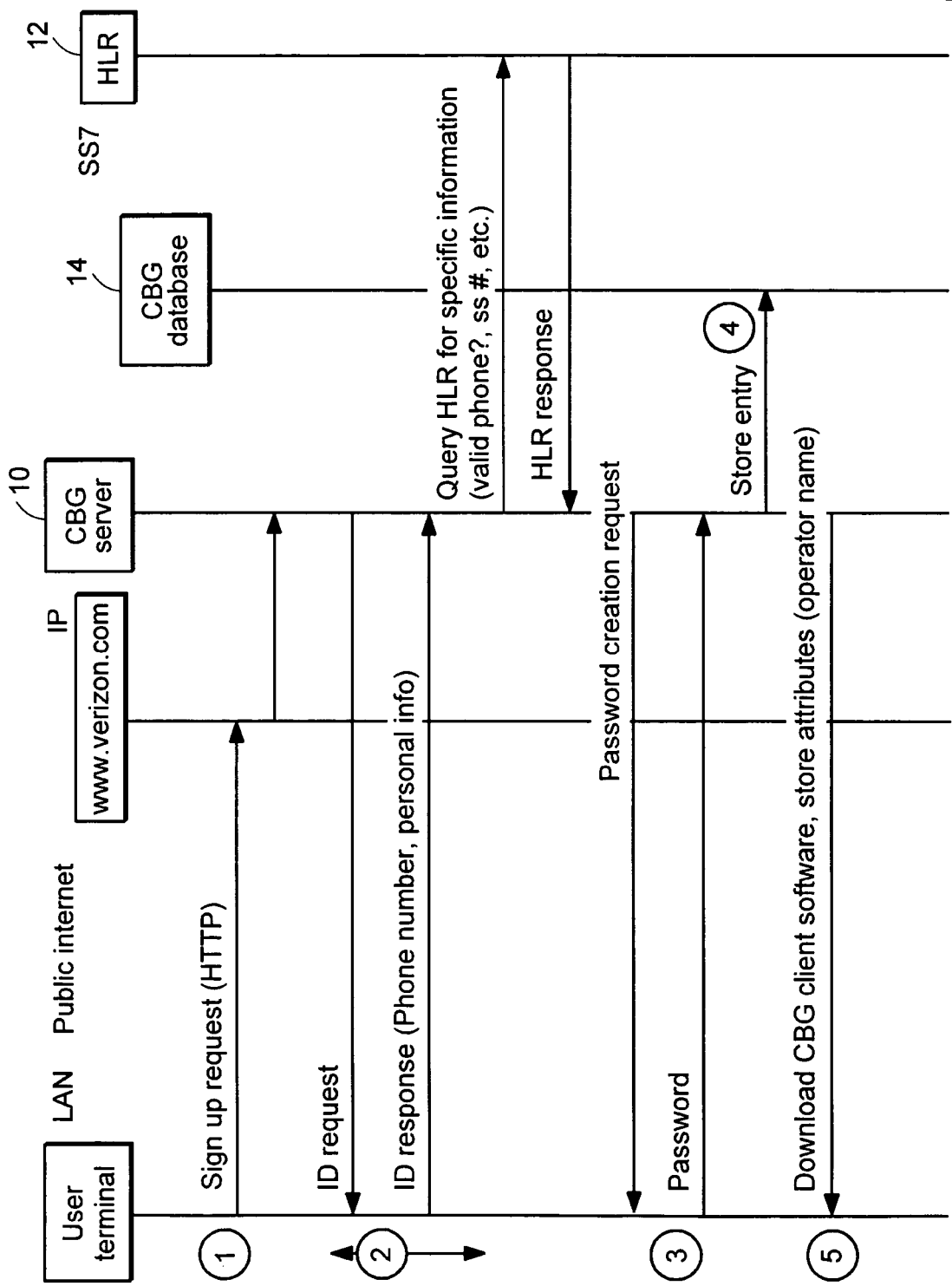
FIG. 19 is a simplified call flow diagram illustrating service signup using an existing Internet access device in accordance with some embodiments of the invention.

In the first signup scenario, the user signs up for WAN services from his terminal using an existing Internet access mechanism such as, e.g, from home or work. It is assumed the user has a LAN-only NIC, without a SIM or other WAN features. The call flow is summarized below and in FIG. 19:

1. The user subscribes to carrier-certified LAN access service by going to a carrier web site through existing Internet access such as from home or work. The request is forwarded to the CBG server 10.

2. The service provisioning module in CBG server 10 gets ID information from the user and validates user's identity by checking against the operator's database (similar to adding other WAN services).

3. The user creates a password associated with a login such as a phone number.

4. This information is stored in local database associated with CBG server 10.

5. The CBG downloads CBG client on the terminal (client contains some operator-specific service attributes as well as usage instrumentation utility).

Figure 20:
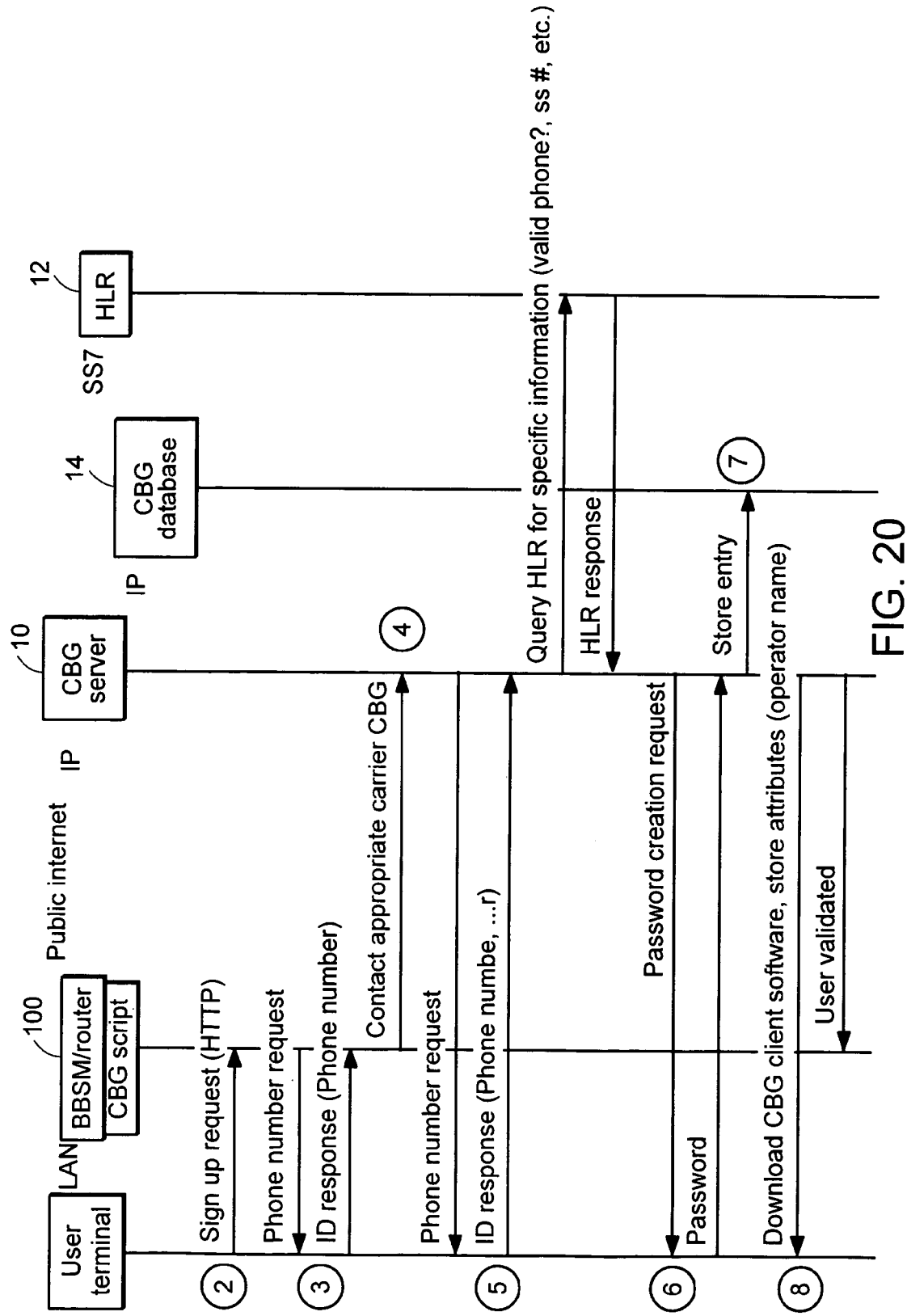
FIG. 20 is a simplified call flow diagram illustrating service signup from BBSM-enabled hotspot in accordance with some embodiments of the invention.

In a second signup scenario, the user goes to a public hotspot such as an airport that deploys a BBSM 100. The BBSM has been modified by the CBG script. The user has his own terminal with him. The terminal is assumed to have a LAN-based NIC such as an 802.11 card and does not have any WAN-specific features such as a SIM. The call flow is summarized below and in FIG. 20:

1. The user goes to hotspot with laptop and sees signs for carrier-certified LAN access.

2. The user goes to a signup web site. The BBSM script provides signup page with carrier option (This script is a set of configuration parameters provided by the CBG).

3. The user provides information about the operator he subscribes to.

4. The BBSM 100 determines which CBG server 10 to go to (depending on operator selected) and allows authentication exchange with the CBG.

5. The CBG Service provisioning module requests identification information from the user (such as, e.g., address and social security digits) and validates the user's identity by checking against HLR 12 (similar to adding other WAN services).

6. Once validated, the user creates a password associated with a login such as a phone number.

7. This information is stored in local database associated with the CBG server 10.

8. The CBG server 10 downloads CBG client on the terminal with attributes stored, such as operator's name as well as instrumentation code.

9. The BBSM 100 directs other non-WAN user requests to other AAA devices.

Figure 21:
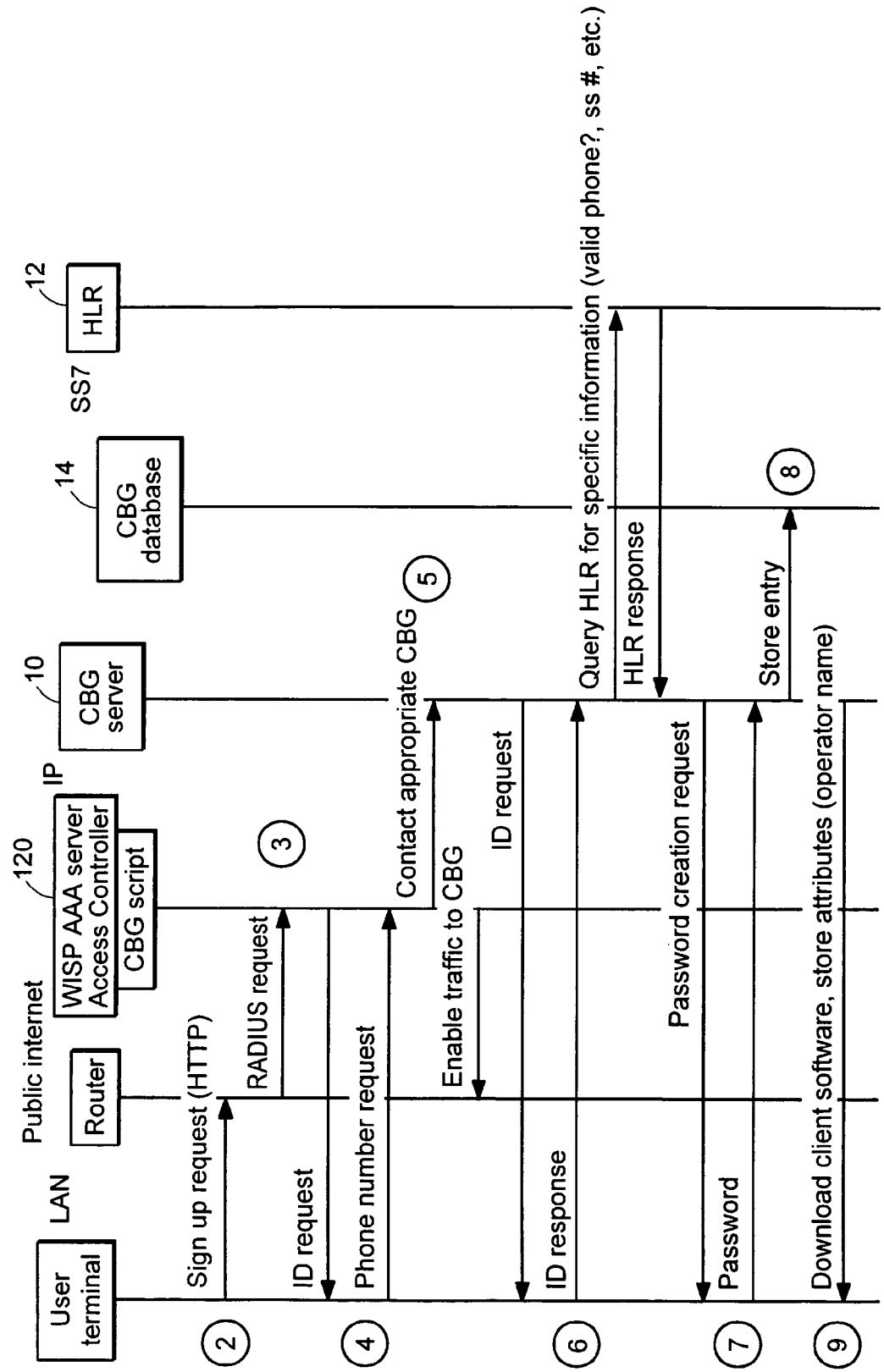
FIG. 21 is a simplified call flow diagram illustrating service sign up from WISPR-enabled hotspot in accordance with some embodiments of the invention.

In a third signup scenario, the user goes to a public hotspot such as a coffee shop. Suppose that the coffee shop implements wireless roaming (WISPR) support. (WISPR is a consortium defining roaming protocols.) The user uses his terminal and has a LAN-based interface card without WAN support. The call flow is summarized below and in FIG. 21:

1. The user goes to coffee shop with laptop and sees signs for carrier-certified LAN access.

2. The WISP access controller 120 allows service selection through a web page.

3. All authentication requests are directed to the access controller.

4. The user responds with WAN access request.

5. The service request is forwarded to appropriate CBG server 10 and authentication traffic is allowed to go through to CBG server 10.

6. The service provisioning module in CBG server requests identification information and validates user's identity by checking identity of user against database (similar to adding WAN other services).

7. After validation, the user creates a password associated with a login such as a phone number.

8. This information is stored in the local database associated with the CBG server.

9. The CBG server 10 downloads CBG client on the terminal with attributes stored, such as operator's name.

In a fourth signup scenario, the user goes to a hotspot that uses iPass as a clearinghouse. The user takes his terminal that is assumed to have a LAN-based interface without any WAN support. The iPass transaction center is assumed to have been modified with CBG support.

Typical operation with iPass is as follows:

1. The user signs up for iPass and downloads iPassConnect client.

2. The user comes to hotspot and runs client and enters login/password or other way of authentication.

3. The network access server at the hotspot passes on the encrypted information to a transaction center.

4. The transaction center contacts the associated RoamServer to authenticate with corporation's database, which then allows traffic through.

Figure 22:
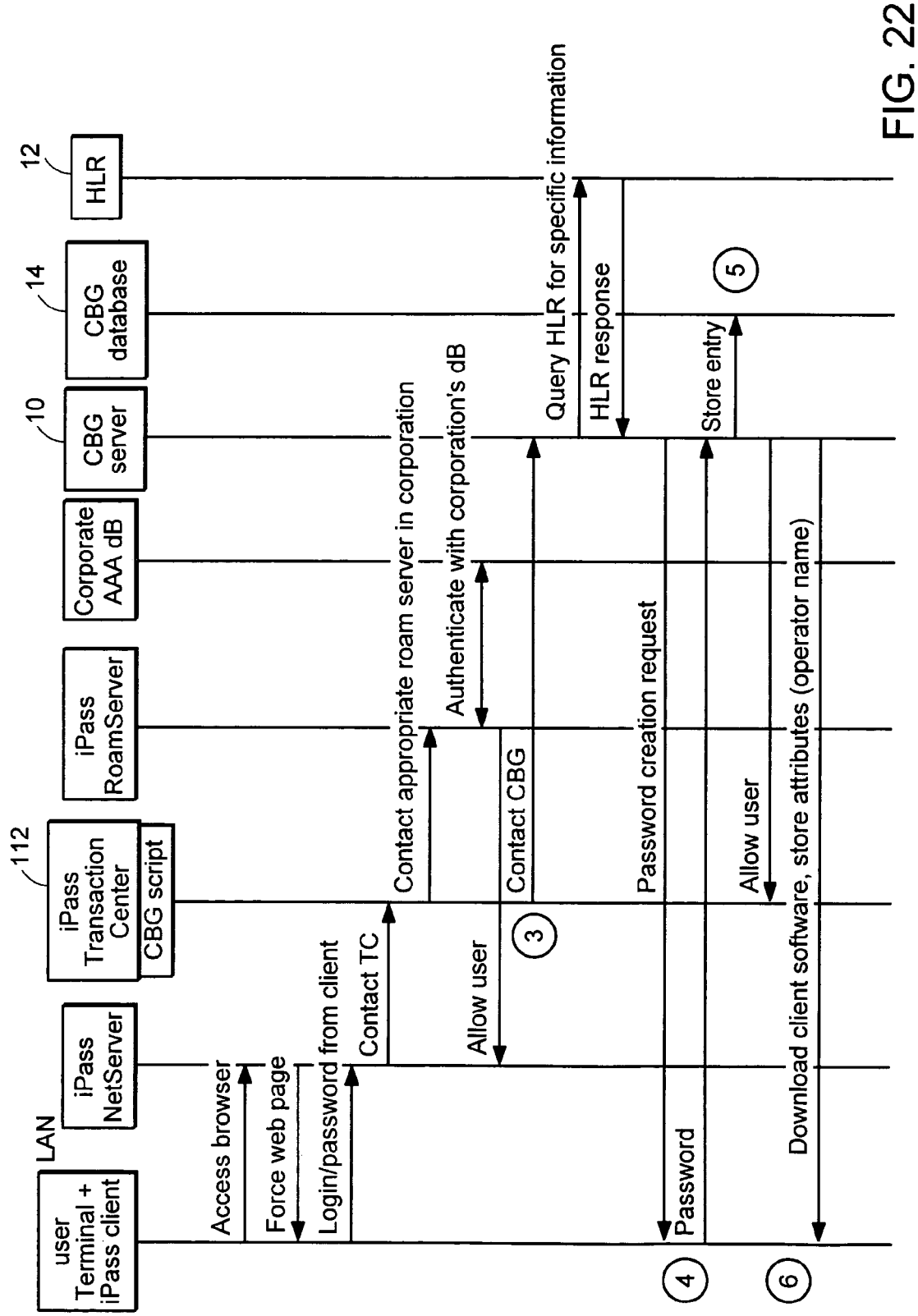
FIG. 22 is a simplified call flow diagram illustrating service signup for iPass-enabled hotspot in accordance with some embodiments of the invention.

If iPass is in place, for some select users, the iPass transaction center 112 contacts the CBG server 10. The call flow with iPass is summarized below and in FIG. 22:

1. The user goes to hotspot, requests to signup.

2. The user selects WAN as the connection.

3. The request from transaction center is routed to appropriate the CBG server 10 using configuration information in the script.

4. The CBG server 10 gets the user identification information as before, validates the user, and creates account.

5. The user information is stored in local CBG server database 14.

6. The CBG server downloads CBG client on terminal.

Figure 23:
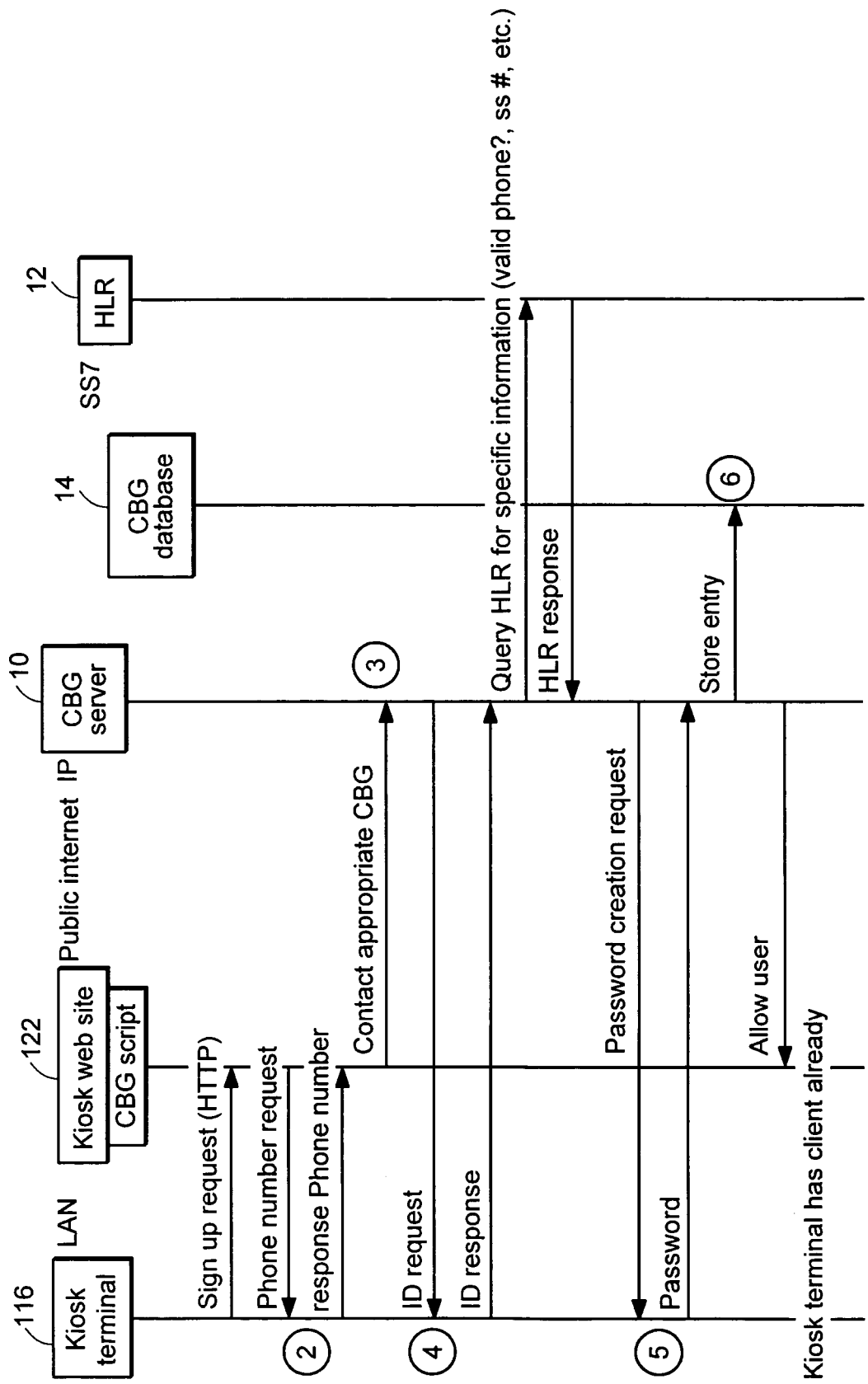
FIG. 23 is a simplified call flow diagram illustrating service signup from kiosk in accordance with some embodiments of the invention.

In a fifth signup scenario, the user goes to a public access terminal, such as a kiosk. The kiosk is modified to support the CBG. The call flow is summarized below and in FIG. 23:

1. The user comes to airport and sees sign for service and goes to the kiosk and to a web site 122 to create an account.

2. The kiosk 116 has a CBG script that checks which operator the user belongs to.

3. The kiosk 116 contacts appropriate CBG server 10 to continue with service.

4. The CBG service provisioning module gets the user's identification information and validates user's identity by checking identity of user against database (similar to adding other services).

5. The user creates a password associated with a login such as a phone number.

6. This information is stored in local database associated with CBG server. (The kiosk terminal already has a CBG client on it so there is no client download.)

Figure 24:
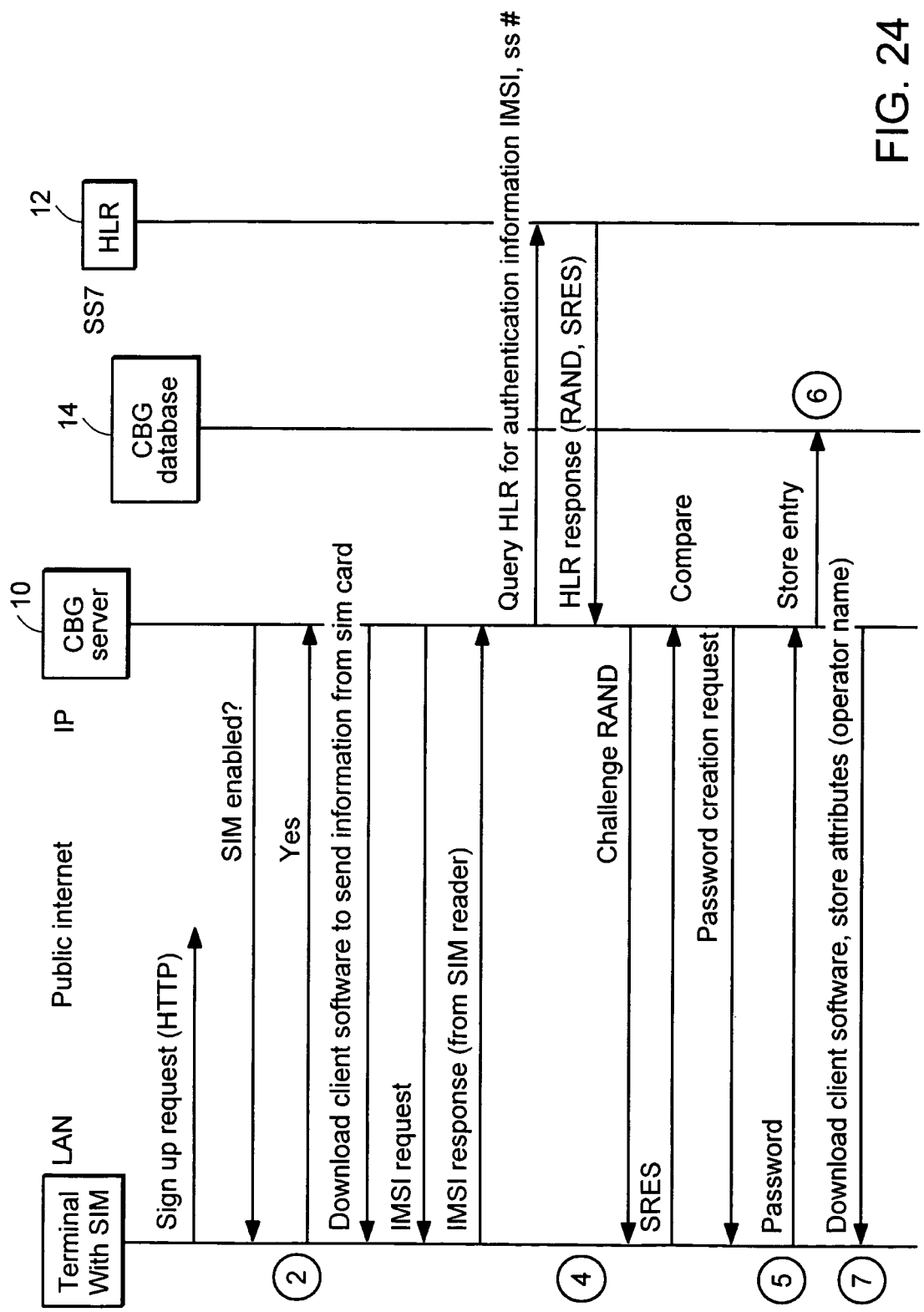
FIG. 24 is a simplified call flow diagram illustrating service signup with a SIM-enabled NIC in accordance with some embodiments of the invention.

Signup call flows are now described for the case when the user has a SIM-enabled terminal such as the SIM-enabled 802.11 NIC card. The user may request sign up from any one of the five settings described earlier. The call flow related to SIM authentication is described below and in FIG. 24:

1. The user subscribes to carrier-certified LAN access service in any of the previous methods.

2. The service provisioning module in CBG server 10 has option to specify whether or not there is SIM enabled terminal.

3. If yes, then a basic reader is downloaded on the terminal.

4. The service provisioning module validates terminal identity by getting challenge/response pair from HLR and comparing challenge with user's response.

5. The user creates a password associated with phone number as login as an additional login mechanism in case the user desires to access his account without a SIM-enabled terminal.

6. This information is stored in local database associated with CBG server 10 as in previous case.

7. The operator also downloads CBG client with attributes such as operator's name and instrumentation utility.

Figure 25:
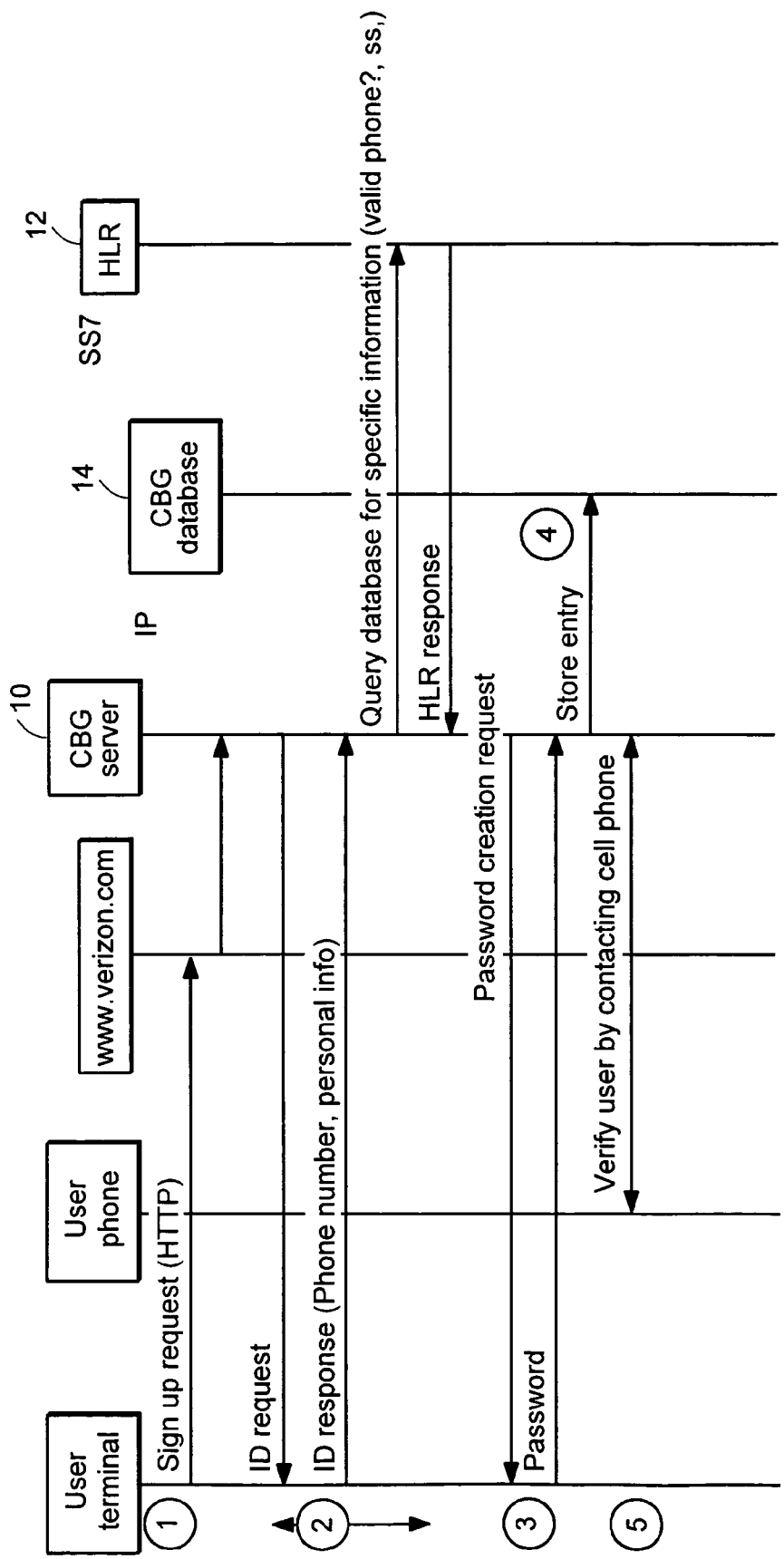
FIG. 25 is a simplified call flow diagram illustrating service signup using a phone and login in accordance with some embodiments of the invention.

Service signup for the two factor authentication mechanism is now described. The service signup for this mechanism is quite similar to the ones described in the previous section with the exception that the phone is used in addition for authenticating the user. The call flow for a sample scenario for the user signing up for service from home or office is described below with reference to FIG. 25.

1. The user subscribes to a carrier-certified LAN access service by going to carrier web site, through existing Internet access.

2. The service provisioning module in the CBG 10 validates the user's identity by checking against the operator's database.

3. The user creates a password associated with a login such as a phone number.

4. This information is stored in local database associated with the CBG 10.

5. The CBG 10 verifies that the user is in possession of a phone by using one of the mechanisms described earlier.

Figure 26:
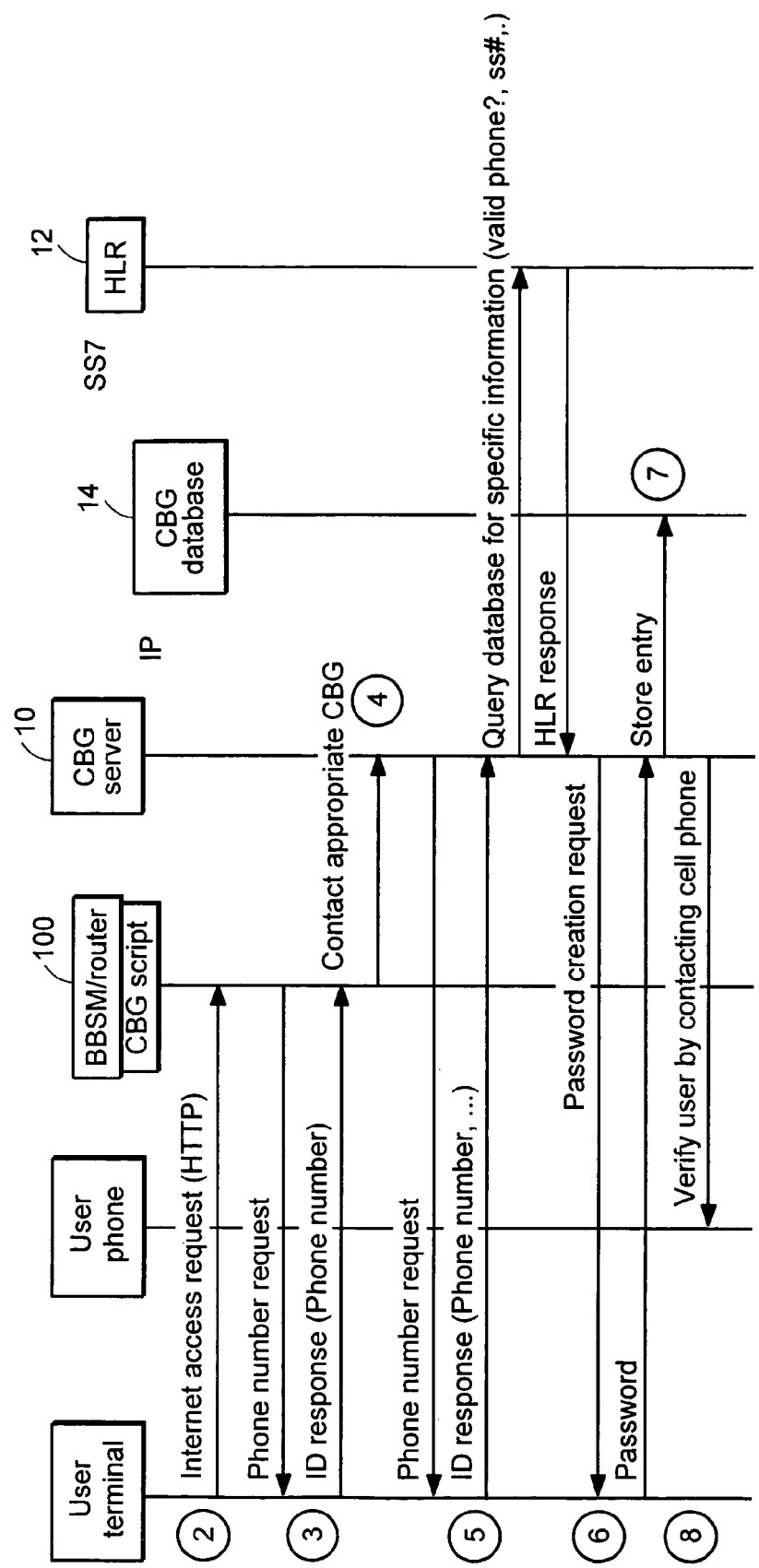
FIG. 26 is a simplified call flow diagram illustrating service signup from RADIUS-enabled hotspot in accordance with some embodiments of the invention.

FIG. 26 and the call flow below illustrate an example of service signup from a RADIUS-enabled hotspot using the BBSM 100. This generally applies to most of the other RADIUS based setups described earlier.

1. The user goes to a hotspot with a laptop or other terminal and sees signs for carrier-certified LAN access.

2. The user goes to designated web site. The BBSM provides signup page with carrier options.

3. The user enters his phone number.

4. The BBSM 100 determines which CBG 10 to go to (depending on operator selected).

5. The CBG Service provisioning module validates the user's identity by checking the identity of the user against a database.

6. The user creates a password associated with a login such as the phone number.

7. This information is stored in a local database associated with the CBG 10.

8. The CBG verifies that the user is in possession of a phone by using one of the mechanisms described earlier.

9. The BBSM 100 directs other requests to other AAA devices.

Service signup for 802.1x enabled-user is now described. As mentioned previously, the service signup for this case is similar to the signup for the non-SIM enabled case for all the scenarios. The only difference is that the user might have to download a 802.1x client if he does not have support for 802.1x. Also, for some cases, the user might be assigned a certificate.

Service Usage Call Flows

Call flows are now described demonstrating how a subscriber starts using service once he has created an account. The call flows described in the previous section relate to actual creation of the service and are ordinarily executed only the first time the user signs up for service. During subsequent usage, service usage call flows described below are used generally every time the user uses service.

Service Usage from Hotspot with BBSM

Figure 27:
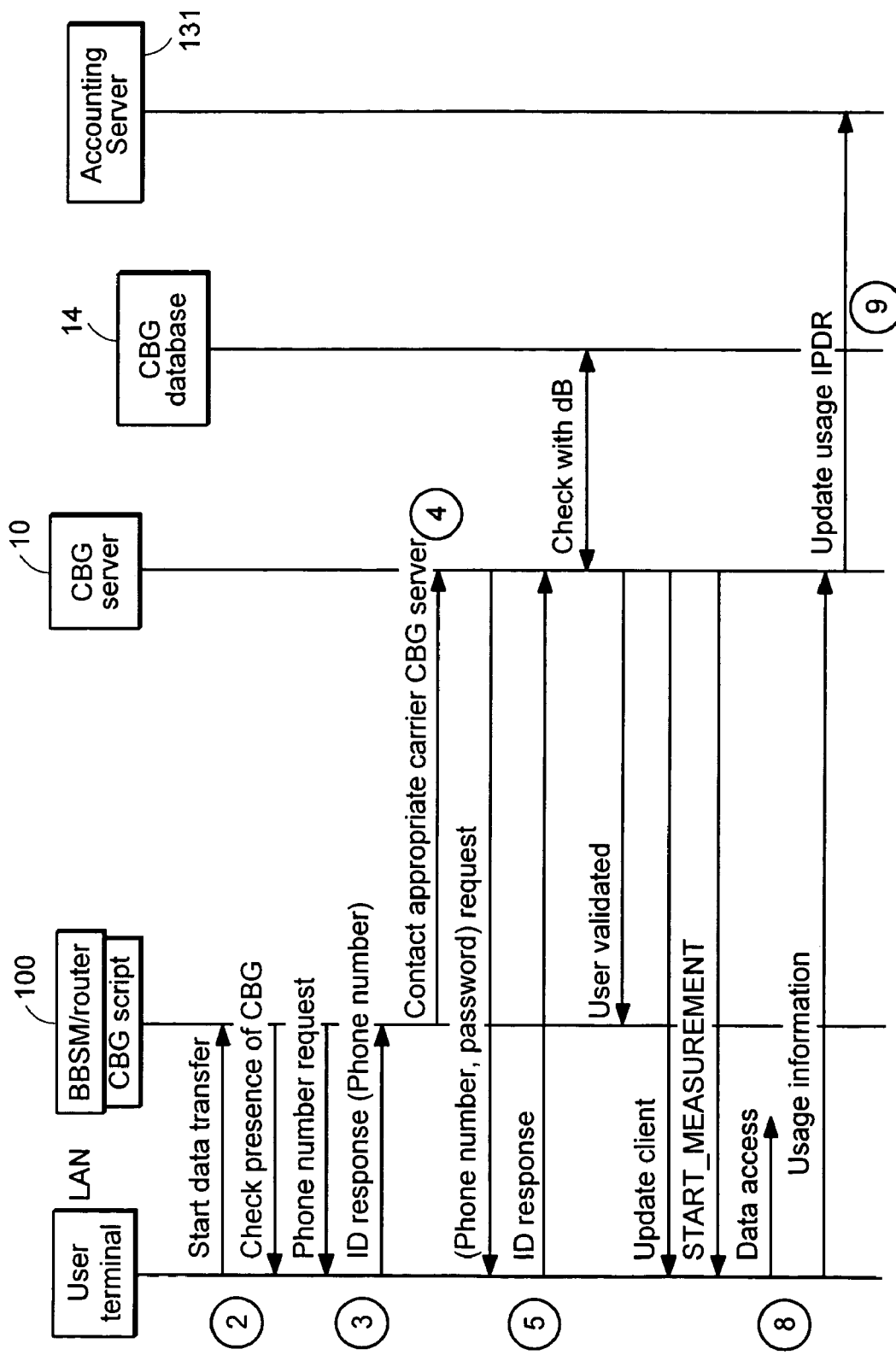
FIG. 27 is a simplified call flow diagram illustrating service usage from a BBSM enabled hotspot in accordance with some embodiments of the invention.

In this setting, the user goes to a hotspot with his terminal. The CBG client has already been downloaded on the terminal and the terminal does not have any WAN capabilities like the SIM. The call flow is summarized below with reference to FIG. 27.

1. The user goes to a hotspot with a laptop and starts accessing Internet traffic.
2. The BBSM 100 provides a login page with carrier option. (This script is a set of configuration parameters provided by the CBG.)
3. The user enters a selected operator.
4. The BBSM 100 contacts the corresponding CBG server 10.
5. The CBG service usage module validates the user's identity by checking the identity of user against database.
6. The CBG server 10 validates user and asks client to start collecting usage information.
7. The user starts accessing the Internet.
8. The usage information is periodically transferred to the CBG server 10.
9. The CBG server sends the usage information to an Accounting server 131.
10. The Billing/Mediation systems can then retrieve usage information.

The CBG server preferably checks the client version after login and updates it if necessary to get latest version. This also addresses the case that the user may have created an account from a kiosk, but never actually downloaded the client since he did not have his own terminal at that time.

Service Usage from Coffee Shop

Figure 28:
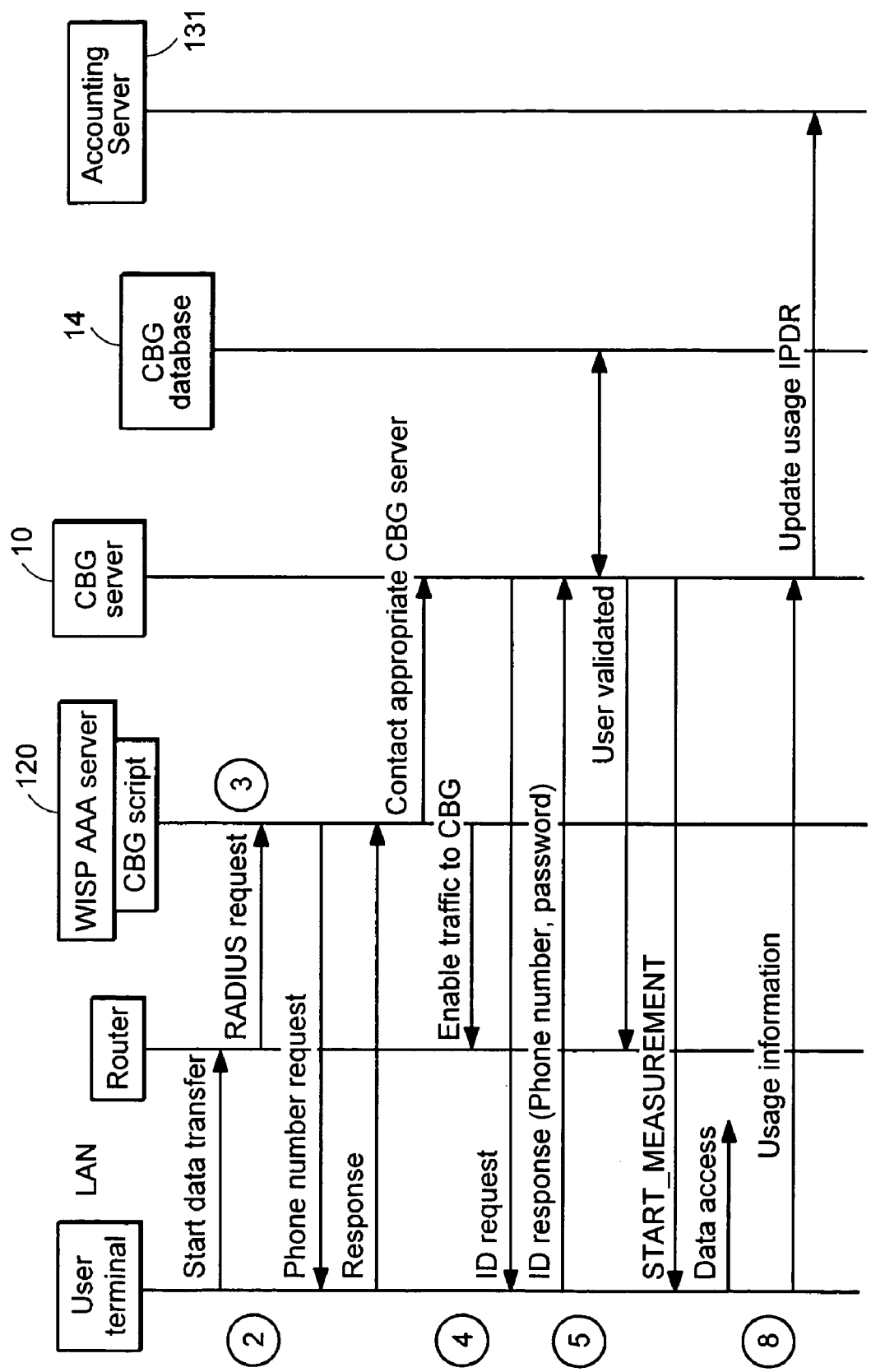
FIG. 28 is a simplified call flow diagram illustrating service usage from WISPR-enabled hotspot in accordance with some embodiments of the invention.

In this scenario, the user goes to a WISPR enabled location such as a coffee shop and starts using the service. The user has created an account previously and the client has been downloaded on the terminal. The terminal does not have SIM capabilities. The call flow is summarized below and in FIG. 28.

1. The user goes to the coffee shop with a laptop or other terminal and sees signs for carrier-certified LAN access.
2. The user starts accessing the Internet.
3. The router forwards an authentication request to the WISP access controller 120.
4. The WISP access controller configuration script determines the appropriate CBG server 10 to contact.
5. The CBG service usage module validates the user's identity by checking the identity of user against a database
6. The CBG server 10 validates the user and asks the client to start collecting usage information.
7. The user starts accessing Internet.
8. Usage information is periodically transferred from the client to CBG server.
9. The CBG server 10 sends the usage information to the Accounting server 131.
10. The Billing/Mediation systems can then retrieve the usage information.

Service Usage from Hotspot with iPass

Figure 29:
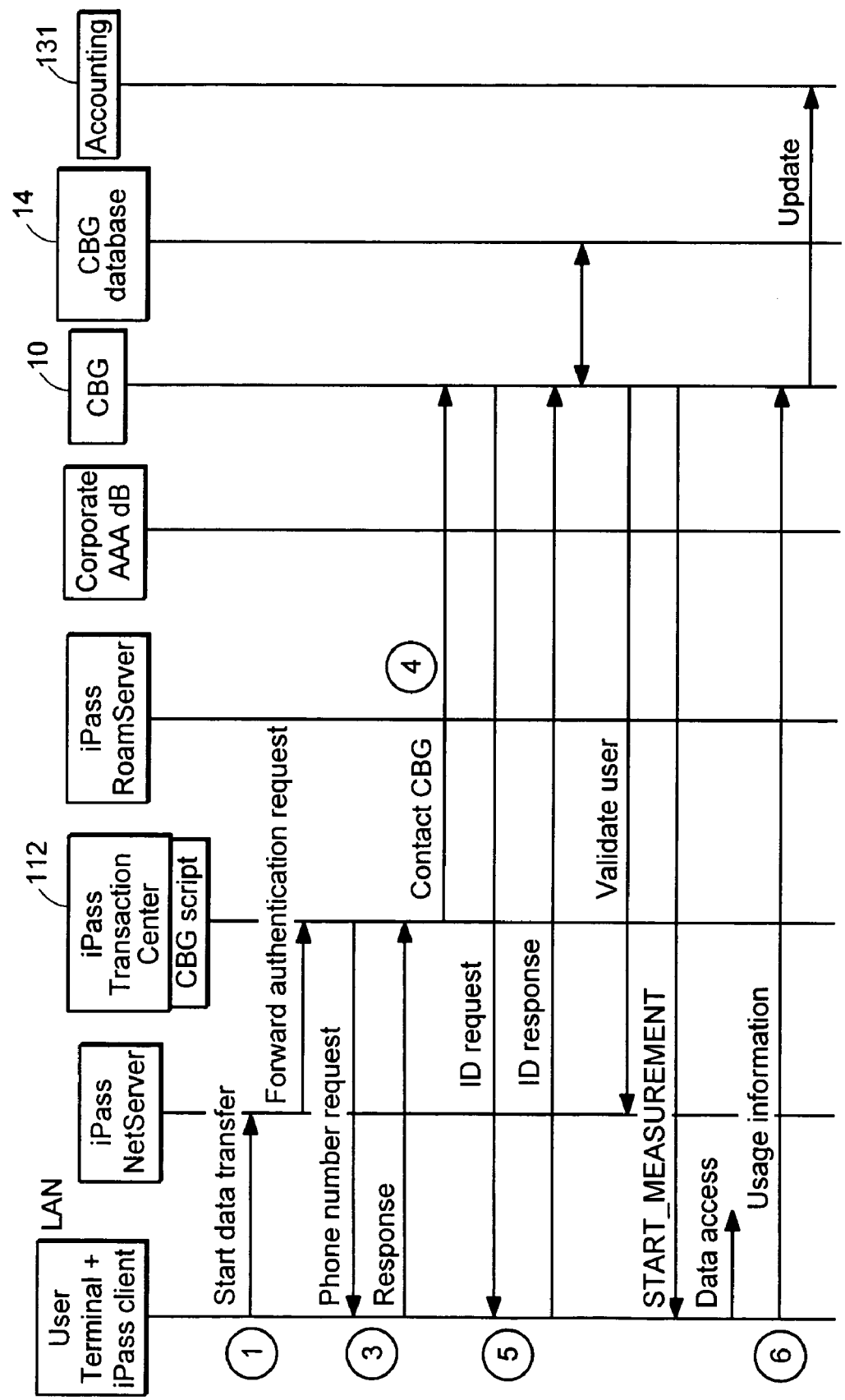
FIG. 29 is a simplified call flow diagram illustrating service usage from an iPass-enabled hotspot in accordance with some embodiments of the invention.

In this scenario the user accesses the service from a hotspot that has been enabled with iPass. The user's terminal has downloaded the client and does not have SIM capabilities. The call flow is summarized below and in FIG. 29.

1. The user goes to the hotspot, and tries to start accessing data.
2. An authentication request is sent to the iPass transaction center 112.
3. The user specifies WAN as the connection type.
4. The configuration script in the transaction center determines the appropriate CBG server 10.
5. The CBG service usage module gets identification information from the user and matches it with its local database. The CBG server validates the user and asks the client to start collecting usage information.
6. The CBG client collects usage information and sends it to CBG server 10 periodically. The CBG server 10 generates usage records that can be accessed by the carrier billing and mediation systems.

Service Usage from Kiosk

Figure 30:
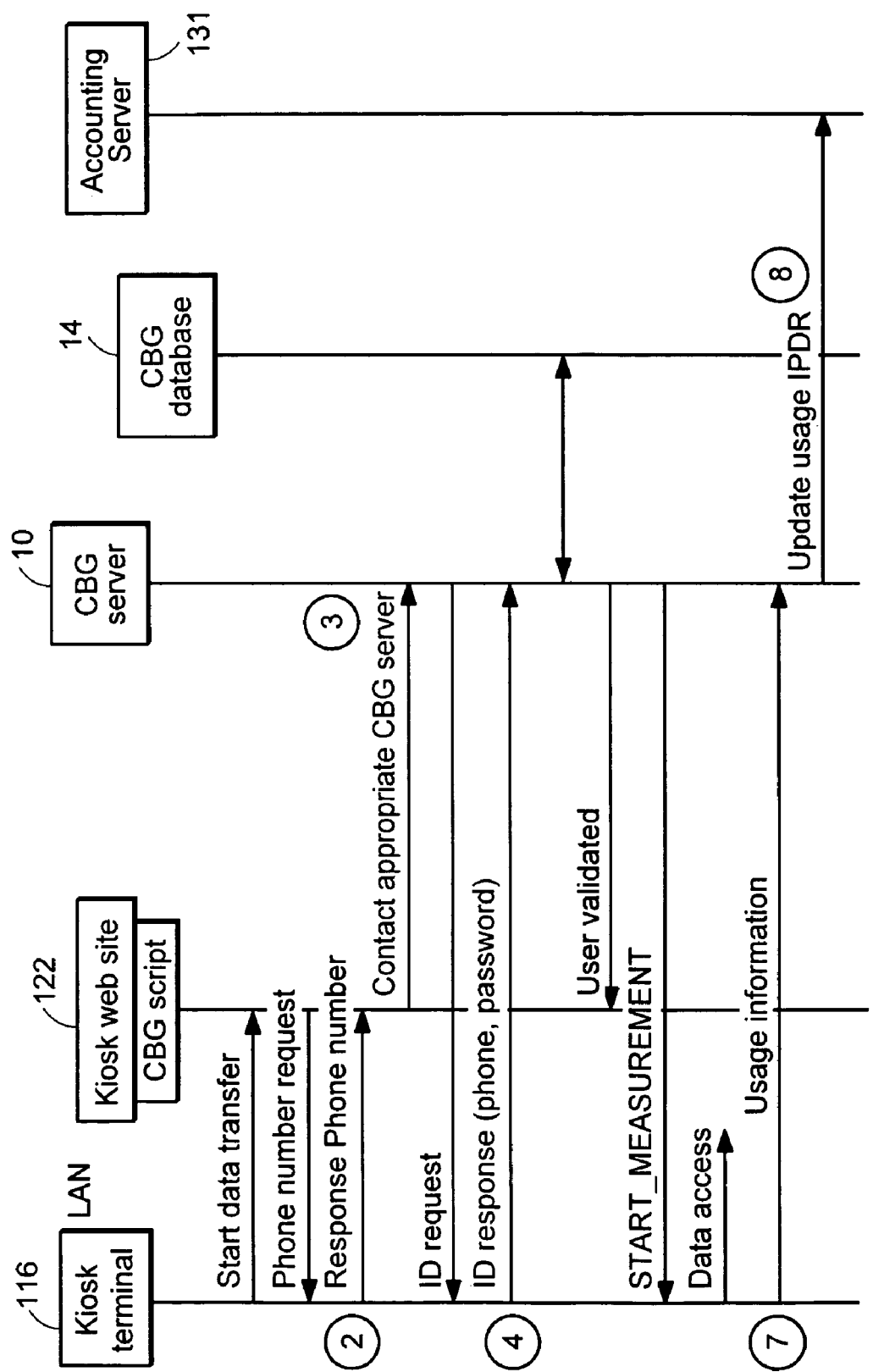
FIG. 30 is a simplified call flow diagram illustrating service usage from kiosk in accordance with some embodiments of the invention.

In this scenario, the user accesses the service from a kiosk. The user is assumed to have already created an account. The call flow is summarized below and in FIG. 30.

1. The user comes kiosk 116 and starts accessing the Internet.
2. The kiosk configuration script starts the login procedure.
3. The kiosk 116 contacts the appropriate CBG server 10 to continue with service.
4. The CBG service usage module validates the user's identity by checking identity of user against database.
5. The CBG 10 validates the user and asks client to start collecting usage information.
6. The user starts accessing Internet.
7. Usage information is periodically transferred to the CBG server 10.
8. The CBG server sends usage information to the Accounting server 131.
9. The Billing/Mediation systems can then retrieve usage information.

Service Usage with SIM-Enabled NIC

Figure 31:
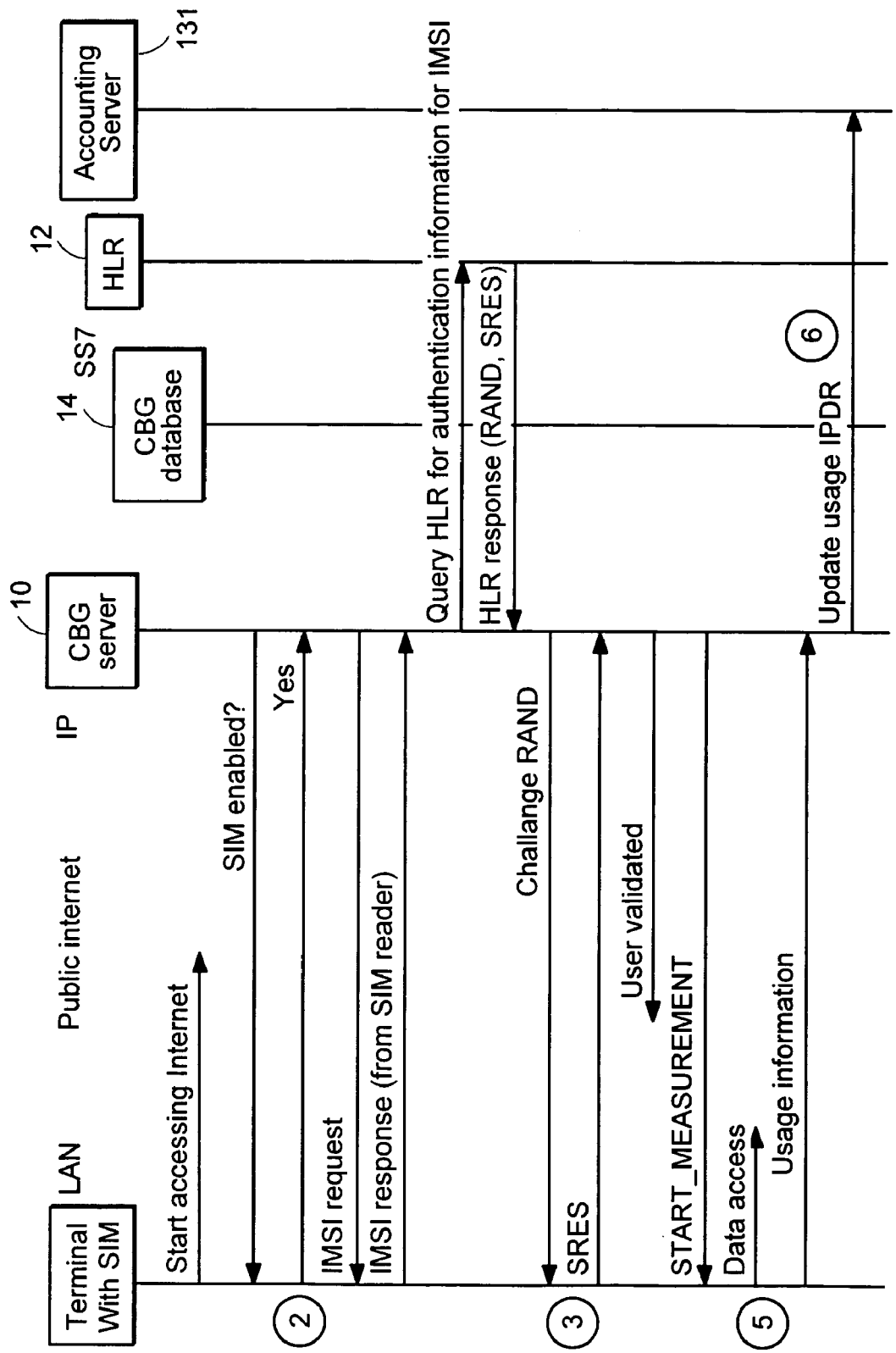
FIG. 31 is a simplified diagram illustrating service usage with SIM-enabled NIC in accordance with some embodiments of the invention.

This section describes the call flow when the user is using the service with a SIM-enabled NIC. The access method can be any one of the four methods described earlier. The call flow is summarized below and in FIG. 31.

1. The user starts accessing data from one of the methods previously described.
2. The CBG service usage module has option to specify whether or not there is SIM enabled terminal.
3. If yes, the service usage module validates the terminal identity by getting a challenge/response pair from HLR and comparing challenge with the user's response.
4. The user starts accessing the Internet.
5. Usage information is periodically transferred to CBG server 10.
6. The CBG server 10 sends the usage information to the Accounting server 131.

7. The Billing/Mediation systems can then retrieve usage information.

Service Usage for Two-Factor Authentication

Call flows are illustrated below for the scenario where the user's phone is used for a strong authentication.

Figure 32:
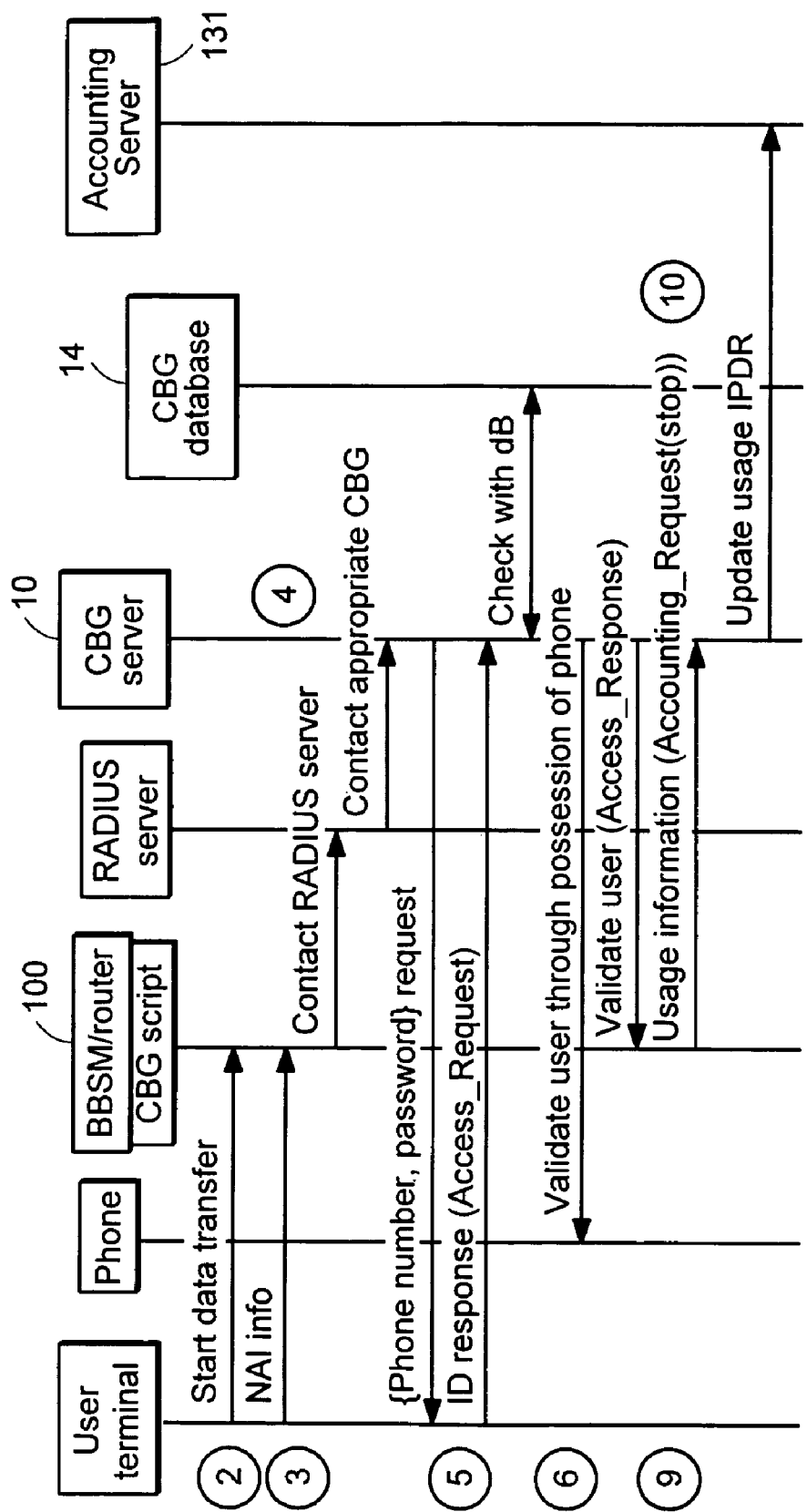
FIG. 32 is a simplified call flow diagram illustrating service usage from BBSM/router enabled hotspot in accordance with some embodiments of the invention.

FIG. 32 illustrates an example call flow for service usage from a BBSM/router enabled hotspot.

1. The user goes to hotspot with his laptop or other terminal and starts accessing Internet traffic.
2. The BBSM 100 provides a login page with carrier option.
3. The user enters his phone number and selects the realm.
4. The BBSM RADIUS client contacts the appropriate CBG.
5. The CBG RADIUS module receives the login and password and compares against internal database.
6. The CBG Token server establishes authentication with the user's phone.
7. The CBG validates the user.
8. The user starts accessing Internet.
9. Usage information is sent from router/radius client to CBG at end of the user session.
10. The CBG sends the usage information to the Accounting server.
11. The Billing/Mediation systems retrieve the usage information.

Figure 33:
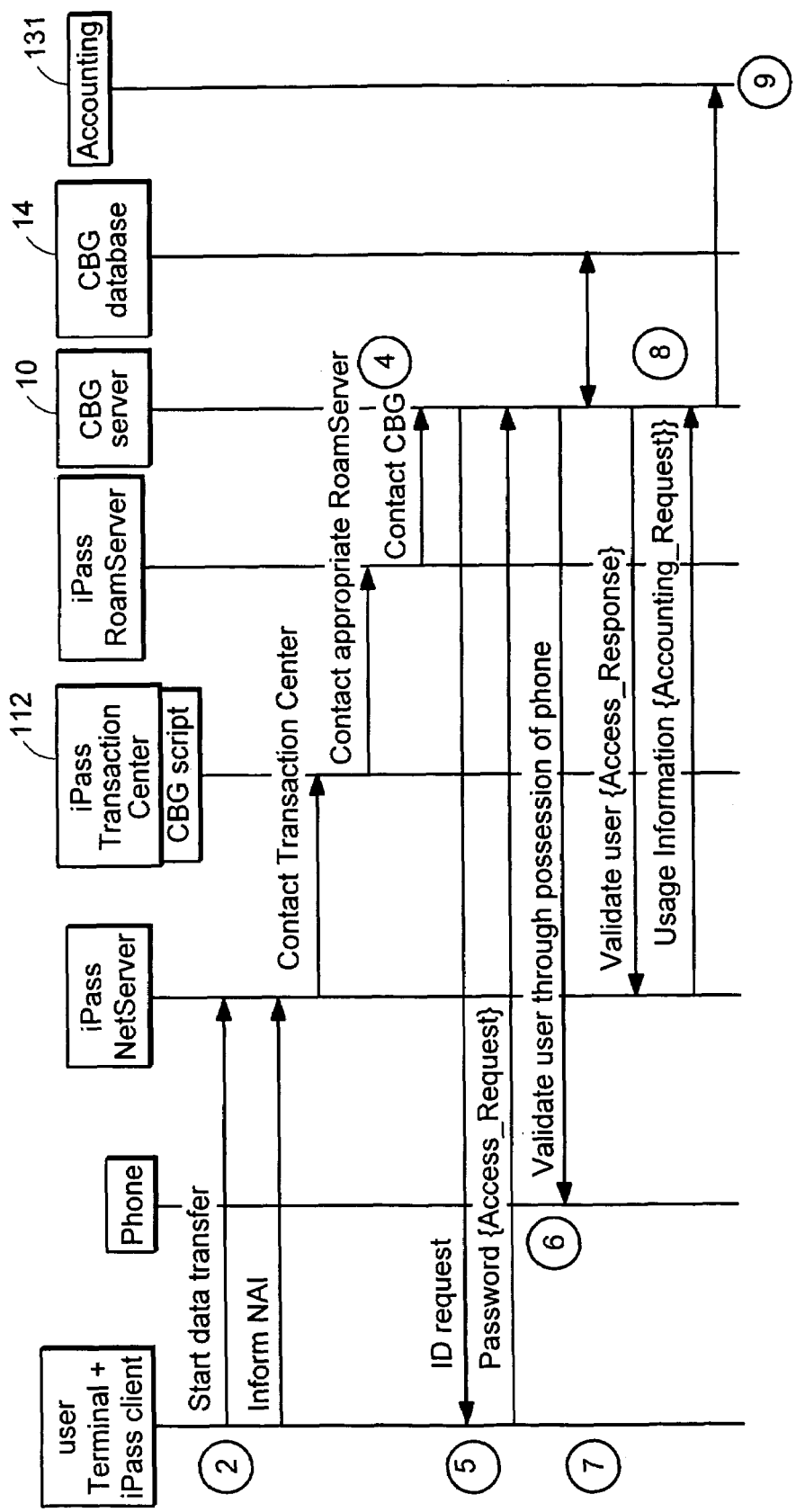
FIG. 33 is a simplified call flow diagram illustrating service usage from iPass-enabled hotspot in accordance with some embodiments of the invention.

FIG. 33 illustrates an example call flow for service usage from an iPass enabled hotspot.

1. The user goes to the hotspot, and starts accessing data. The terminal has an iPass client.
2. The user specifies NAI (Network access identifier) as part of the connection.
3. The configuration script in transaction center determines appropriate CBG 10.
4. The request from transaction center is routed to the appropriate CBG.
5. The CBG 10 matches the phone number with its database to authenticate the user.
6. The CBG 10 verifies the user through possession of phone.
7. The CBG 10 verifies the user.
8. The CBG 10 receives usage information at the end of the user session.
9. The CBG 10 generates accounting information to be collected by the billing/mediation systems.

Service Usage for 802.1x System

The service usage for 802.1x follows a sequence similar to the non-SIM case, with the exception that the user does not have be intercepted through the web browser.

1. The user fires up terminal and starts 802.11 NIC.
2. The access point blocks traffic and queries the user for authentication.
3. The user sends either the login/password or certificate authentication using 802.1x.
4. The CBG verifies the user.
5. The user starts accessing Internet.
6. Usage information is periodically transferred to the CBG server 10.
7. The CBG server sends the usage information to the Accounting server 131.
8. The Billing/Mediation systems can then retrieve usage information.

CBG Implementation

By way of example, the CBG can be implemented using the following components.

The CBG server can be a carrier-class system that is built on a Sun/Solaris platform. In one embodiment, the HLR interface is designed to use a Trillium stack and GSM MAP software. The AAA interface can be through RADIUS or DIAMETER. The database modules can be implemented on an Oracle real-time database. The database can also be accessed through a LDAP interface.

The CBG client can be a piece of software that is implemented on popular end-user platforms, such as Windows 2000, Windows 98, Pocket PC, Symbian OS, and Palm OS. The CBG server downloads the client code. The client code communicates with the device drivers in the network interface to compute usage. It also preferably includes encryption mechanisms to send authentication and usage information to the CBG. Typical encryption schemes such as 128 b SSL can be used.

CBG Architecture Features

The CBG in accordance with various embodiments of the invention has a number of advantageous features including the following.

First, the CBG is not restricted to SIM-based terminals. It enables LAN users using virtually any IP based interface to be authenticated with a WAN system. It also supports LAN users with a SIM-enabled device to be authenticated with the WAN system.

In addition, the CBG generates consistent usage information, regardless of the access technology.

Furthermore, it has a flexible architecture that works with a variety of hotspot deployments and does not restrict the hotspot architecture.

The CBG can be used with virtually any IP based access system, including wired as well as wireless LANs.

Also, the CBG architecture supports multiple operators within a given hotspot.

The CBG can be used with mobile IP for integrating their authentication with the HLR.

Having described preferred embodiments of the present invention, it should be apparent that modifications can be made without departing from the spirit and scope of the invention.

The invention claimed is:

1. A method, operative in a gateway, for managing usage of a local area network (LAN) by a subscriber of a wide area network (WAN), the wide area network being operated by an entity providing a telecommunication service that is normally accessible to the subscriber by having an existing WAN authentication mechanism authenticate the subscriber when the subscriber uses the WAN to obtain the telecommunication service, the WAN having an existing WAN billing mechanism, comprising:

(a) detecting an attempt by a terminal operated by the subscriber to access the LAN;

(b) authenticating the subscriber based on authentication information received from the subscriber and corresponding information of record at the existing WAN authentication system, wherein the information of record is associated with the subscriber's WAN identity and the information received from the subscriber is one of: (i) IMSI information obtained from a SIM card associated with the terminal, (ii) a user login and password obtained during a service provisioning, (iii)

IMSI information provided in software executable in the terminal, (iv) IMSI information provided in a network server, (v) a token or one time password exchanged by the terminal through SMS, (vi) a token or one time password exchanged by the terminal through USSD, and (vii) a token or one time password generated using an application associated with a SIM card;

(c) after the subscriber is authenticated, receiving information on subscriber usage of the LAN; and (d) transmitting the information on subscriber usage of the LAN to the existing WAN billing mechanism for integrated billing by the entity of LAN and WAN usage, wherein the information on subscriber usage of the LAN is transmitted using a data structure that the existing WAN billing mechanism expects to receive;

wherein the gateway interacts with the existing WAN authentication mechanism and the existing WAN billing mechanism, without modifications to those mechanisms, to enable the subscriber to access, to use, and to be billed for the subscriber usage of the LAN using the subscriber's WAN identity.

2. The method of claim 1 wherein the data structure includes at least one optional field that includes data identifying the gateway as a source of the information on subscriber usage of the LAN.

3. The method of claim 1 wherein the WAN authentication mechanism is a home location register (HLR) for the WAN.

4. The method of claim 1 wherein the information on subscriber usage of the LAN is measured by one of: a client program running on the terminal, an existing LAN measurement infrastructure, and a monitor deployed in the LAN.

5. The method of claim 1 wherein network server is a web site.

6. The method of claim 5 wherein the information of record associated with the subscriber's WAN identity includes at least one of: a name, an address, a date of birth, and one or more digits of a social security number.

7. The method of claim 1 wherein the LAN is located at a public access venue.

8. The method of claim 1 wherein the entity providing the telecommunications service applies a billing policy to the subscriber usage of the LAN that differs from a billing policy applied to the subscriber's usage of the WAN.

9. The method of claim 1 wherein the terminal attempts to access the LAN using an Internet Protocol (IP) interface.

10. The method of claim 9 wherein the IP interface is one of: a wired Ethernet interface, a wireless Ethernet interface, and a Bluetooth interface.

11. The method of claim 1 wherein the entity is a GSM operator.

12. The method of claim 1 wherein the entity is a CDMA operator.

13. The method of claim 1 wherein the entity is an Internet Service Provider (ISP).

14. A converged network accessible by a wireless client device, comprising:

a wide area network (WAN) being operated by an entity providing a telecommunication service that is normally accessible to a subscriber by having a WAN authentication mechanism authenticate the subscriber when the subscriber uses the WAN to obtain the telecommunication service, the WAN having a WAN billing mechanism; and a gateway linked to the WAN and at least one local area network (LAN), the gateway being operative (a) to authenticate the subscriber based on authentication information received from the subscriber and corresponding information of record at the WAN authentication mechanism, wherein the information received from the subscriber is one of: (i) IMSI information obtained from a SIM card associated with the wireless client device, (ii) a user login and password obtained during a service Provisioning, (iii) IMSI information provided in software executable in the wireless client device, (iv) IMSI information provided in a network server, (v) a token or one time Password exchanged by the wireless client device through SMS, (vi) a token or one time password exchanged by the wireless client device through USSD, and (vii) a token or one time password generated using an application associated with a SIM card; (b) to receive information on subscriber usage of the LAN; and (c) to transmit the information on subscriber usage of the LAN to the WAN billing mechanism for integrated billing by the entity of LAN and WAN usage, wherein the information on subscriber usage of the LAN is transmitted using a data structure that the WAN billing mechanism expects to receive.

15. The converged network of claim 14 wherein a credential of the subscriber is stored in at least one of (i) a back end system of the WAN and (ii) a database maintained by the gateway.

16. The converged network of claim 15 wherein the back end system of the WAN is a home location register (HLR).

17. The converged network of claim 14 wherein the LAN is located at a public access venue.

18. The converged network of claim 14 wherein the data structure includes at least one optional field that includes data identifying the gateway as a source of the information on subscriber usage of the LAN.

19. The converged network of claim 14 wherein the entity is a GSM operator.

20. The converged network of claim 14 wherein the entity is a CDMA operator.

21. The converged network of claim 14 wherein the entity is an Internet Service Provider (ISP).

22. A gateway for managing usage of a local area network (LAN) by a subscriber of a wide area network (WAN), the subscriber having a wireless client device, the WAN being operated by an entity providing a telecommunication service that is normally accessible to a subscriber by having a WAN authentication mechanism authenticate the subscriber when the subscriber uses the WAN to obtain the telecommunication service, the WAN having a WAN billing mechanism, comprising:

a processor; and code executable by the processor (a) to authenticate the subscriber based on authentication information received from the subscriber and corresponding information of record at the WAN authentication mechanism, wherein the information received from the subscriber is, one of: (i) IMSI information obtained from a SIM card associated with the wireless client device, (ii) a user login and password obtained during a service provisioning, (iii) IMSI information provided in software executable in the wireless client device, (iv) IMSI information provided in a network server, (v) a token or one time password exchanged by the wireless client device through SMS, (vi) a token or one time password exchanged by the wireless client device through USSD, and (vii) a token or one time password generated using an application associated with a SIM card; (b) to receive information on subscriber usage of the LAN; and (c) to transmit the information on subscriber usage of the LAN to the WAN billing mechanism for billing by the entity of LAN and WAN usage, wherein the information on subscriber usage of the LAN is transmitted using a data structure that the WAN billing mechanism expects to receive.

23. The gateway of claim 22 wherein the data structure includes at least one optional field that includes data identifying the gateway as a source of the information on subscriber usage of the LAN.

24. The gateway of claim 23 wherein the at least one optional field is a Node ID field of a GPRS call data record.

25. The method of claim 1 wherein information on subscriber usage of the LAN is provided by an access server or router at the LAN.

26. The method of claim 1 wherein the data structure is in a format selected from one of: IPDR, GPRS CDR, TAP 3, and XML.

27. A method, operative in a gateway, for managing usage of a local area network (LAN) by a subscriber of a wide area network (WAN), the wide area network being operated by an entity providing a telecommunication service that is normally accessible to the subscriber by having an existing WAN authentication mechanism authenticate the subscriber when the subscriber uses the WAN to obtain the telecommunication service, the WAN having an existing WAN billing mechanism, comprising:

(a) authenticating the subscriber based on authentication information received from the subscriber and corresponding information of record at the existing WAN authentication mechanism, wherein the information of record is associated with the subscriber's WAN identity and the information received from the subscriber is one of: (i) IMSI information obtained from a SIM card associated with the terminal, (ii) a user login and password obtained during a service provisioning, (iii) IMSI information provided in software executable in the terminal, (iv) IMSI information provided in a network server, (v) a token or one time password exchanged by the terminal through SMS, (vi) a token or one time password exchanged by the terminal through USSD, and (vii) a token or one time password generated using an application associated with a SIM card;

(b) receiving information on subscriber usage of the LAN; and (c) transmitting the information on subscriber usage of the LAN to the existing WAN billing mechanism for billing by the entity of LAN and WAN usage, wherein the information on subscriber usage of the LAN is transmitted using a data structure that the existing WAN billing mechanism expects to receive;

wherein the gateway interacts with the existing WAN authentication mechanism and the existing WAN billing mechanism, without modifications to those mechanisms, to enable the subscriber to access, to use, and to be billed for the subscriber usage of the LAN using the subscriber's WAN identity.

28. The method as described in claim 27 wherein the information on subscriber usage of the LAN is measured by one of: a client program running on the terminal, an existing LAN measurement infrastructure, and a monitor deployed in the LAN.

29. The method as described in claim 27 wherein the data structure includes at least one optional field that includes data identifying the gateway as a source of the information on subscriber usage of the LAN.

30. The method as described in claim 29 wherein the at least one optional field is a Node ID field of a GPRS call data record.

31. The method as described in claim 27 wherein the entity providing the telecommunications service applies a billing policy to the subscriber usage of the LAN that differs from a billing policy applied to the subscriber's usage of the WAN.

32. The method as described in claim 27 wherein the entity is one of: a GSM operator, a CDMA operator, and an Internet Service Provider (ISP).

* * * * *